(12) United States Patent
Qureshi et al.

(10) Patent No.: US 7,487,214 B2
(45) Date of Patent: Feb. 3, 2009

(54) INTEGRATED ELECTRONIC MAIL AND INSTANT MESSAGING APPLICATION

(75) Inventors: Imran I. Qureshi, Milpitas, CA (US); Jason C. Fluegel, Seattle, WA (US); Charles Reeves Little, Bellevue, WA (US); Mikhail Birman, San Carlos, CA (US); Justin B. Voskuhl, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 292 days.

(21) Appl. No.: 10/985,394

(22) Filed: Nov. 10, 2004
(Under 37 CFR 1.47)

(65) Prior Publication Data

US 2006/0101119 A1 May 11, 2006

(51) Int. Cl.
*G06F 15/16* (2006.01)
(52) U.S. Cl. .................................................. 709/206
(58) Field of Classification Search ............... 709/206
See application file for complete search history.

(56) References Cited

U.S. PATENT DOCUMENTS

| | | | | |
|---|---|---|---|---|
| 6,484,196 | B1 * | 11/2002 | Maurille | 709/206 |
| 7,263,526 | B1 * | 8/2007 | Busey et al. | 707/102 |
| 2002/0042830 | A1 * | 4/2002 | Bose et al. | 709/230 |
| 2002/0116531 | A1 * | 8/2002 | Chu | 709/246 |
| 2002/0198943 | A1 * | 12/2002 | Zhuang et al. | 709/206 |
| 2004/0019701 | A1 * | 1/2004 | McGee et al. | 709/250 |
| 2004/0030753 | A1 | 2/2004 | Horvitz | |
| 2004/0064514 | A1 * | 4/2004 | Daniell et al. | 709/206 |
| 2004/0128356 | A1 * | 7/2004 | Bernstein et al. | 709/206 |
| 2004/0158611 | A1 * | 8/2004 | Daniell et al. | 709/206 |
| 2004/0162883 | A1 | 8/2004 | Oreizy et al. | |

OTHER PUBLICATIONS

Venolia, Gina Danielle; Laura Dabbish; JJ Cadiz; Anoop Gupta. "Supporting Email Workflow," Dec. 2001, Microsoft Research, p. 3.*
Lotus Software, "IBM Lotus Notes 6.5.1", ftp://ftp.lotus.com/pub/lotusweb/product/domino/LotusNotes651.pdf, Sep. 3, 2004.

* cited by examiner

*Primary Examiner*—Andrew Caldwell
*Assistant Examiner*—Christopher Biagini
(74) *Attorney, Agent, or Firm*—Vierra Magen Marcus & DeNiro LLP

(57) ABSTRACT

An application providing a common interface allowing access and login to a electronic mail system and instant messaging system. The application allows responding to an email using an instant message, replying to an instant message using an email, sending and receiving both email and instant messages from one application, sending email attachments instantly, and displaying presence information for the user, user email contacts and user messenger contacts. Alerts are provided for both emails and instant messages received. The inbox views can automatically be refreshed when a user receives new email. An interface is provided to convert multiple email contacts into messenger contacts. The system can be used with both local messenger clients and browser based IM clients.

40 Claims, 16 Drawing Sheets

INTEGRATED ELECTRONIC MAIL AND INSTANT MESSAGING APPLICATION

BACKGROUND OF THE INVENTION

1. Field of the Invention

The present invention is directed to integrated electronic email and instant messaging applications.

2. Description of the Related Art

Electronic mail (email) and instant messaging (IM) are two of the most common forms of communication over the Internet. While many entities maintain private email servers which provide email service, a common form of email is web-based having browser based clients. Such email services are provided by service providers such as Microsoft Corporation, of Redmond, Wash., using a web based email service. A computer connected to the Internet can access the web email service using a web browser. Web email services are provided to an email service domain. The email service domain is comprised of entities having an account with the email service. To access a web email service, a user having an account provides a user identifier and a password into a user interface rendered by the browser. After the user identifier and password are confirmed against the user's account, email services are provided to the user through an interface loaded by the browser. Web based email services allow the user to maintain an email contact list, send and receive emails and otherwise manage an email account through the interface.

IM allows a user to send and receive messages nearly instantaneously with other IM service users over a network or collection of networks, such as the Internet. IM services are provided by service providers such as "MICROSOFT" Corporation. A computer connected to the Internet can access the IM service using a client application. The client application can be implemented as a local client or a browser based client. A local client is a program which is stored on the computer and provides an interface allowing a user to access the IM service. A browser based client is a program which is generally provided by a web server. The interface loaded from the server allows the user to access the IM service. IM services are provided to an IM service domain, which is comprised of entities having an account with the IM service.

To use IM, a user establishes an account by providing account information including a user identifier, a password, and a list of messenger contacts. Subsequent login to the service requires the user to provide the user identifier and password. Upon confirmation of the login information with the user's account information, the particular client (either local or browser based) displays an interface indicating the user's presence, messenger contact list and the presence of each contact. Presence is a status indication of whether an entity is online or offline. In another embodiment, a presence can have a state of "busy", "away", "out to lunch", or other states. If the entity, such as the user or a contact on the user's messenger contact list, is logged in to a messenger server within the email service, than the entity's presence is "online". Otherwise, the presence for the entity is "offline".

The user may select a contact from the messenger contact list displayed in an IM interface to initiate a conversation. Once selected, the client-application associated with each conversation member provides a conversation window. In some IM systems, the client applications associated with a conversation receive direct contact information for each other to provide direct communication between them. In other IM services, the client applications for each conversation member are connected to each other through the IM system. When a conversation member sends a message, the IM system receives the message, finds the recipient member's computer location and routes the message to the particular computer. IM services such as "MSN MESSENGER" use this method.

Currently, an email service and an IM service each require their own interface. To access both an email service and an IM service, a discrete interface is required for each service. Some web service providers provide both an email service and an IM service for a user within the service provider's domain. Though these service providers provide an IM service that generates a notification through the IM interface when an email is received for the user within the domain, each service is provided through a separate interface and requires a separate login.

Hence, methods and systems which provide for convenient access to email and IM are of great value.

SUMMARY OF THE INVENTION

An email service and an IM service are integrated such that an application providing a common interface may be used to login and provide access to both. The application allows a user to reply to an email using an instant message to the sender, reply to an instant message with an email, send and receive both emails and instant messages from the same application, send email attachments instantly, and see presence information for the user, user email contacts and user messenger contacts. Alerts are provided for both emails and instant messages received. The system and method can be used with both local messenger clients and browser based IM clients.

A method for providing an integrated email service and IM service can include storing service access account information for users, supplying an email service through a network to each user having a service access account, supplying an instant messaging service through the network to each user having a service access account, and providing an application configured to allow each of the users having a service access account to interact with the email and instant messaging services through a common interface.

A system for providing an integrated email and IM service can include a data store, an email system, an instant messaging system and an application server. The data store contains server access account information for users. The email system and instant messaging system are connected to a network and accessible to each user having a server access account. The application server provides an application to allow users having a service access account to interact with the email system and the instant messaging system through a common interface.

A set of computer-executable instructions can be used to provide the application for the integrated email and IM service. A computer-readable medium can have computer-executable instructions for performing the steps displaying an application interface for an email service and an instant messaging service, accessing the email service responsive to user input from the application interface, and accessing the instant messaging service responsive to user input from the application interface.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers.

These and other objects and advantages of the present invention will appear more clearly from the following description in which the preferred embodiment of the invention has been set forth in conjunction with the drawings.

DETAILED DESCRIPTION

Figure 1:
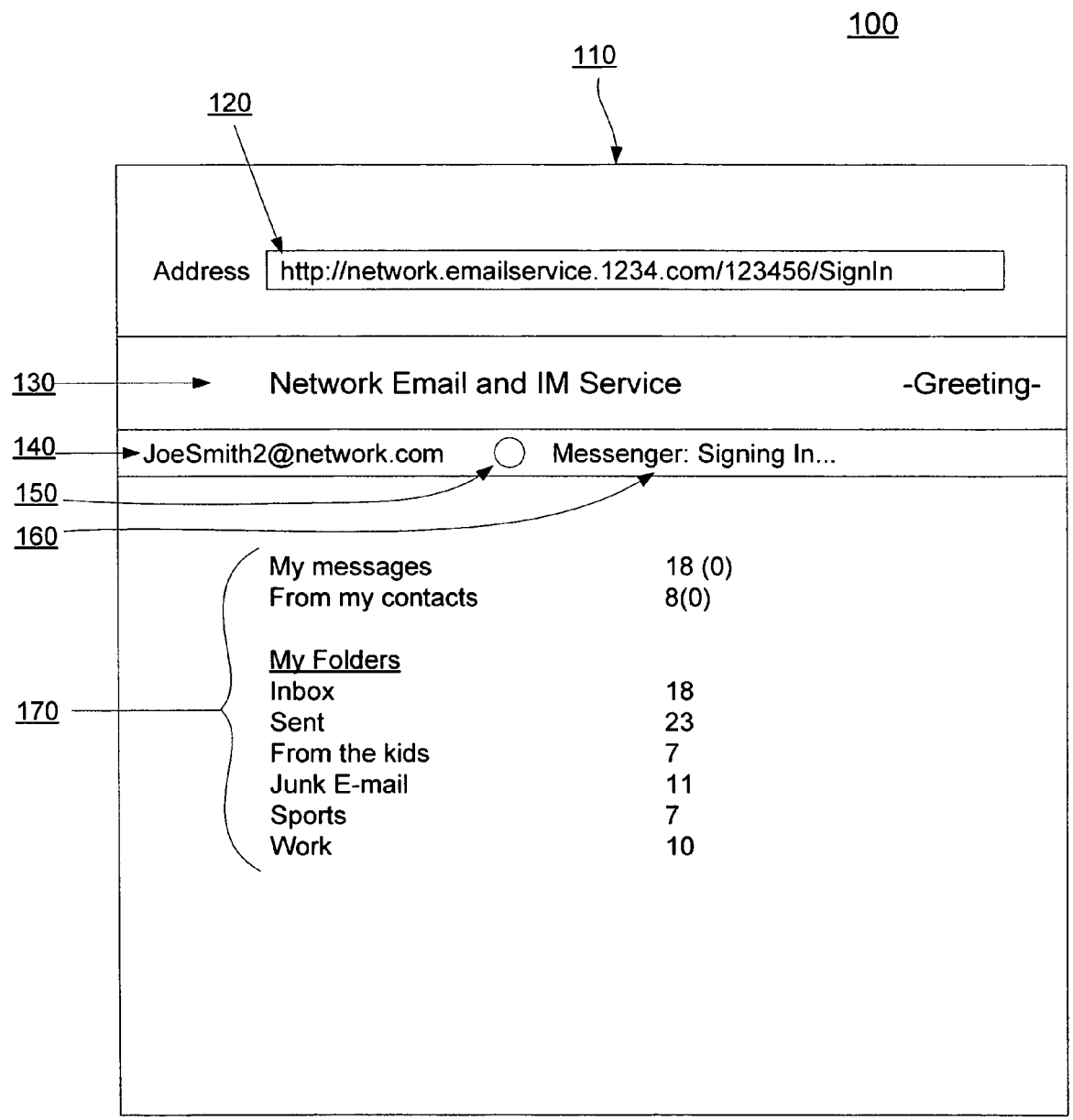
FIG. 1 illustrates one embodiment of an interface for accessing IM and email services.

The present invention described herein provides a method, system and article of manufacture for providing a single application having an interface for accessing an email service (implemented by an email system) and an IM service (implemented by an IM system). The application allows a user to access both services with one login. The email service can be integrated with either a local messenger client or a browser based client. In one embodiment, if the system determines a user is already logged into a local messenger client, the IM service is provided through that client. If the system determines the user is not logged into a local messenger client, the system provides the user access to the IM service using a browser based client.

A user may indicate whether he or she should be logged into the IM service automatically at the time of email login. A presence, or online status indication, is provided for the user and each of the user's messenger contacts. Presence information indicates whether user or contact is logged into the IM service or not. If a user is logged into the messenger server of an IM service, regardless of the client used, the user has a presence set to "online" by default. If the user is not logged into the messenger server of an IM service, the user has a presence set to "offline".

The present invention includes a system and method allowing a user to send and receive email, send and receive instant messages, manage email contact lists and messenger contact lists, and reply to an email using an instant message, all through a common interface. When sending an email having an attached file, the user may choose to send the attached file through the IM service or email service. The IM system can detect alerts associated with new emails and instant messages associated with a user. After detecting an alert for a user, a visual indicator is provided by the IM system. The indicator can be a visual indicator, such as a toast, or some other indicator. If the user selects the toast, the system updates the interface to provide information regarding the toast (e.g., a read email interface for a new email or conversation window for a new instant message). Other visual alerts are possible and within the scope of the present invention.

If a user does not have an account with the IM service at login, the system can display the user's status as online but not actually log the user into the IM service. This allows other users to initiate conversations with the user but prevents unnecessary traffic to the messenger server (associated with the login process) should the user not utilize the service. If a user in this state requests to send an instant message, or receives an instant message from another user, the web IM client will sign the user into the IM service.

FIGS. 1 through 4C illustrate various embodiments of interface pages for accessing the system of the present invention. The interface pages provide information and access to an email and IM service. In one embodiment, the pages include instant messaging status information and instant messaging service access links. The instant messaging status information includes presence indicators for the user and the user email contacts and messenger contacts. The instant messaging service links include links or buttons to functions of the email system and IM system, such as: an instant response link which sends an instant reply to an email through the messenger system; an add messenger contact link which adds one or more email contacts to a messenger contact list; a transmits file link which sends an attachment file to the recipient of an email using the IM system; an instant messaging session acceptance link which accepts an invitation to an IM session; an alert link which provides access to the information associated with an alert; and other functions described below with reference to FIGS. 1 through 13.

FIG. 1 illustrates an embodiment of an interface rendered in a web page 100 for accessing IM and email services. Interface 100 includes window 110, uniform resource locator (URL) 120, web page header 130, user identifier 140, user presence indicator 150, IM system message 160 and page content 170.

The interface pages can be provided through web browser such as Internet Explorer by "MICROSOFT" Corporation. A web browser renders web page from data received from URL 120. The data is provided to a browser over the Internet. Web page header 130 can include a description of the service providing the page, the function the page provides, and advertising. In window 110, web page header 130 includes a service description that reads "Network Email and IM Service" and a page description that reads "Greeting".

User identifier 140 is a unique identifier for the user over the service domain. In one embodiment, unique identifier 140 is an email address having a format such as JoeSmith2@network.com. User presence indicator 150 indicates the presence of the user. A "presence" indicates whether a user is logged into the IM system or not. If a user is not logged into an IM system, the user's presence in that system is set to "offline". If a user is logged in, the user's presence is set to "online". In one embodiment, user presence indicator 150 is only displayed if the associated user is logged in. In some embodiments, user presence indicator 150 may have a different appearance depending if the user is logged in or not. For example, user presence indicator 150 may be a red circle if the associated user is logged in and a green circle if the user is not logged in. Numerous variations may be used, including different shapes, colors, sizes, text effects and formatting, etc. In some embodiments, a user's presence may not accurately reflect whether the user is actually online. For example, a user may indicate to display his presence as online or offline while he is logged into the IM system. In one embodiment, the system may set a user's presence to "online" although he is not logged into the IM system. These scenarios are discussed in more detail below.

IM system message 160 indicates information regarding the IM state of the user. In FIG. 1, IM system message 160 indicates that the user is currently "Signing in . . . " to the IM system. Other IM system message information 160 can include whether a user is online, offline, has a new instant message, a new messenger contact, etc. Page content 170 for window 110 includes information regarding email and IM characteristics for a user, including messages and message folders. In the embodiment illustrated, the interface of window 110 can be provided while the system is logging the user into the IM system.

Figure 2:
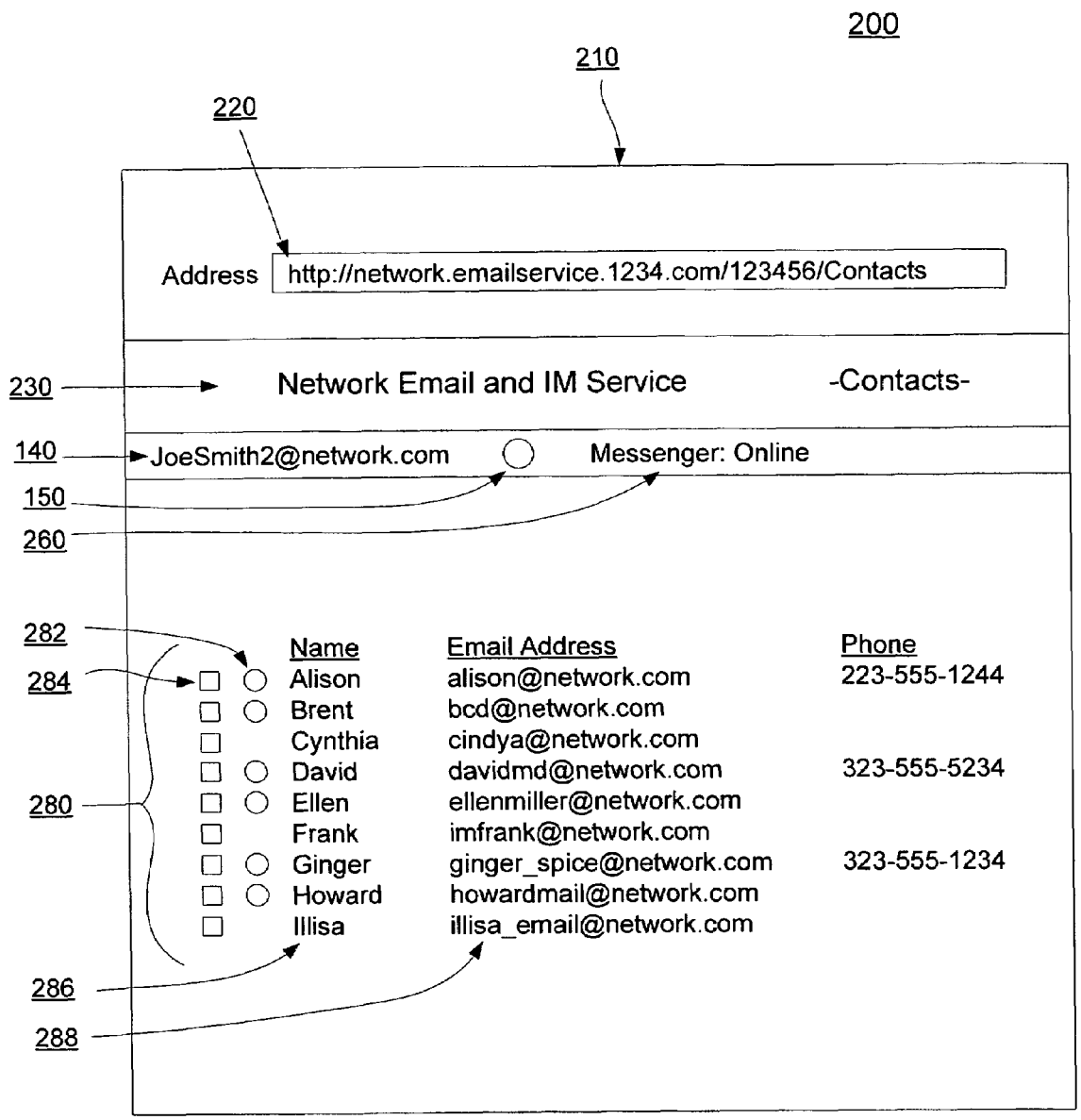
FIG. 2 illustrates a further embodiment of an interface for managing IM and email contacts.

FIG. 2 illustrates an embodiment of an interface rendered in a web page 200 for managing IM and email contacts. Interface 200 includes window 210, URL 220, web page header 230, user identifier 140, user presence indicator 150, IM system message 260, email contact list 280, contact presence indicator 282, contact selector icon 284, contact nickname 286 and contact identifier 288.

Web page header 230 reflects the interface page purpose of managing contacts. User identifier 140 and user presence indicator 150 are the same as described with reference to FIG. 1.

Email contact list 280 is a list of the contacts associated with user identifier 240 in the email service. Contact presence indicator 282 indicates the presence for an associated contact in the email contact list. Contact identifier 288 indicates the unique identifier within the domain of the email service. In the embodiment illustrated, each contact identifier is associated with a presence by the display or omission of an associated contact presence indicator. Thus, the contact identifier Alison@network.com is displayed with a contact presence indicator and is therefore online. In one embodiment, a user can provide input selecting a presence indicator. Once selected, a user may send an instant message to the contact associated with the presence indicator. This is discussed in more detail below. The contact identifier cindya@network.com has a red contact presence indicator, signifying the contact is offline.

The contact selector icon 284 is used to select contacts to delete, add or otherwise perform an action. In one embodiment, the contact selector icon serves as an add messenger contact link adding email contacts to a messenger contact list for a user. The contact nickname 286 is a name associated with the contact identifier.

Figure 3:
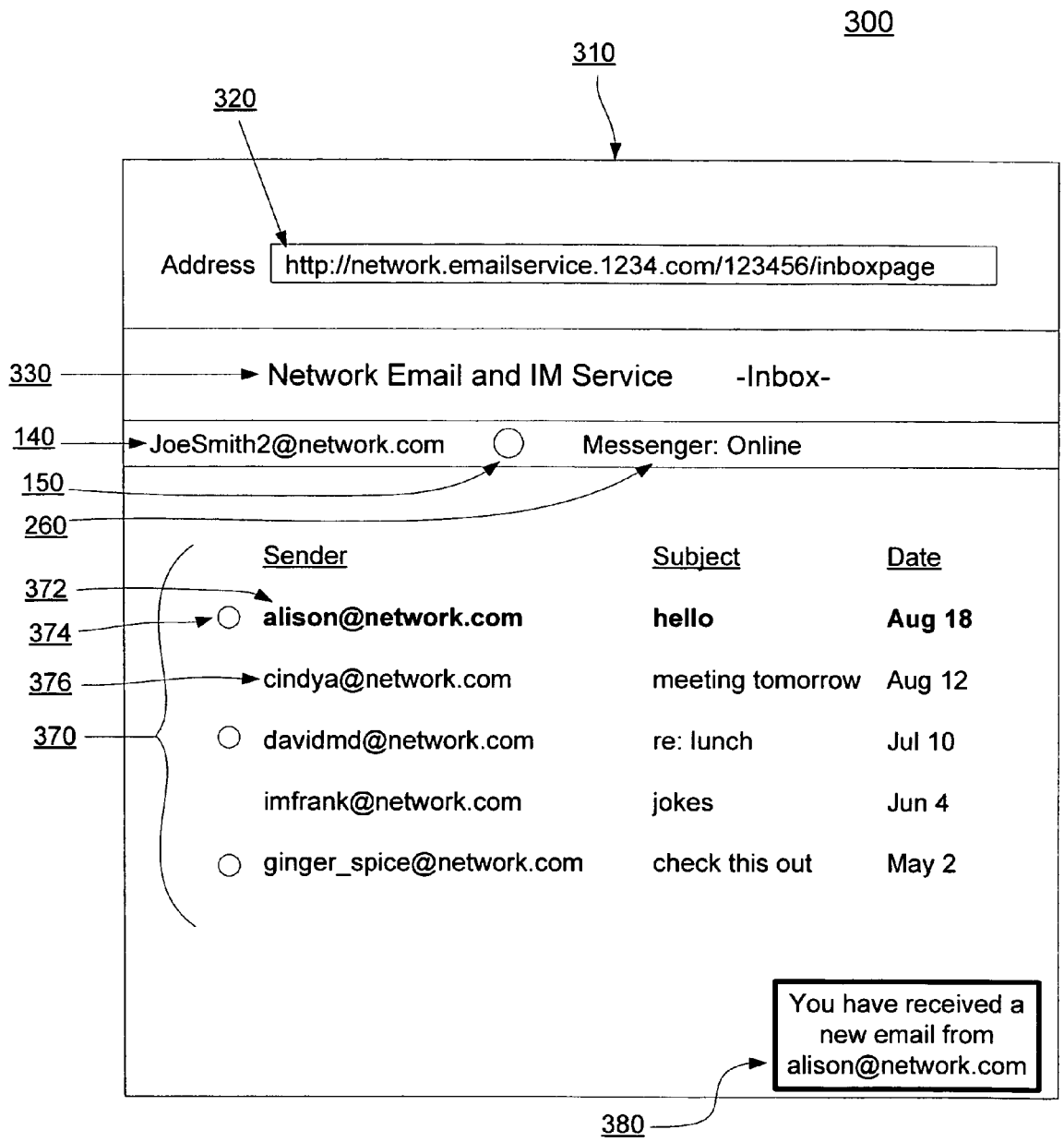
FIG. 3 illustrates an additional embodiment of an interface for providing integrated inbox and IM information.

FIG. 3 illustrates an embodiment of an interface rendered in a web page 300 for providing an inbox integrated with IM information. Interface 300 includes window 310, URL 320, web page header 330, user identifier 140, user presence indicator 150, IM system message 260, inbox content 370, highlighted contact identifier 372, contact presence indicator 374, contact identifier 376, and toast 380. Elements 140, 150 and 260 are discussed with reference to FIGS. 1 and 2, respectively.

Email inbox content 370 within window 310 provides a list of mail messages addressed to the user and received by the email system. Unopened messages are identified in some way, such as a text effect. For example, the unread message associated with user indicator 372, alison@network.com, is in bold face indicating that it has not been read. As shown, the user associated with user indicator 372 has a contact presence indicator 374 and is online. When a user selects contact presence indicator 374, an instant message can be sent to the contact associated with contact identifier 372. This is discussed in more detail below.

Visual indicator 380 is provided in response to the occurrence of an event. The event may be receiving an alert for a new mail message, a new instant message, or some other event. In one embodiment, the visual indicator is a toast provided by the IM system in response to the event.

Figure 4A:
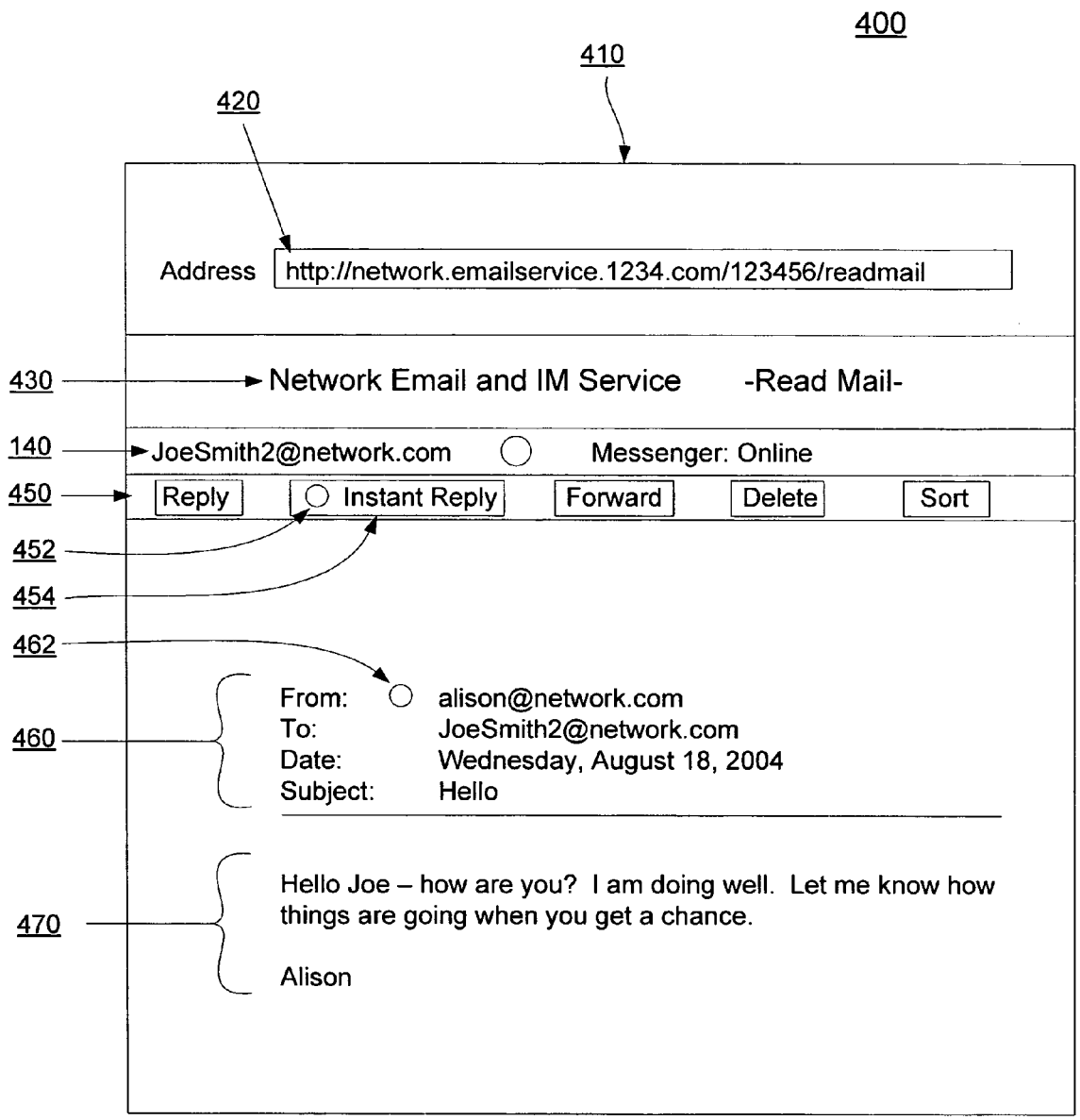
FIG. 4A illustrates another embodiment of an interface for providing an email inbox.

FIG. 4A illustrates an embodiment of an interface rendered in a web page 400 for providing integrated mail content and IM capability. Interface 400 includes window 410, URL 420, web page header 430, user indicator 140, message action bar 150, sender presence indicator 452, instant reply button 454, email header information 460, alternate sender presence indicator 462, and email body 470. Elements 140 and 150 are discussed with reference to FIG. 1.

Message action bar 450 includes links representing actions that can be performed by the system of the present invention. Other links are provided elsewhere in the interface page. For example, instant reply button 454 and sender presence indicator 462 are instant response links in that providing input selecting either of them generates an instant response to the sender of the email. In the embodiment illustrated, the links are provided as buttons representing actions that can be performed regarding the email. When input selecting instant reply link, or button, 454 is received, an IM session, or conversation, is initiated by the IM system between the user and the sender of the email. This process is discussed in more detail below. In the embodiment illustrated, the contact presence indicator 452 of the person who sent the email is provided in instant reply button 454. In some embodiments, the presence of the sender may be located somewhere else on content page 410, such as the alternate sender presence indicator 462 in email header information 460.

Figure 4B:
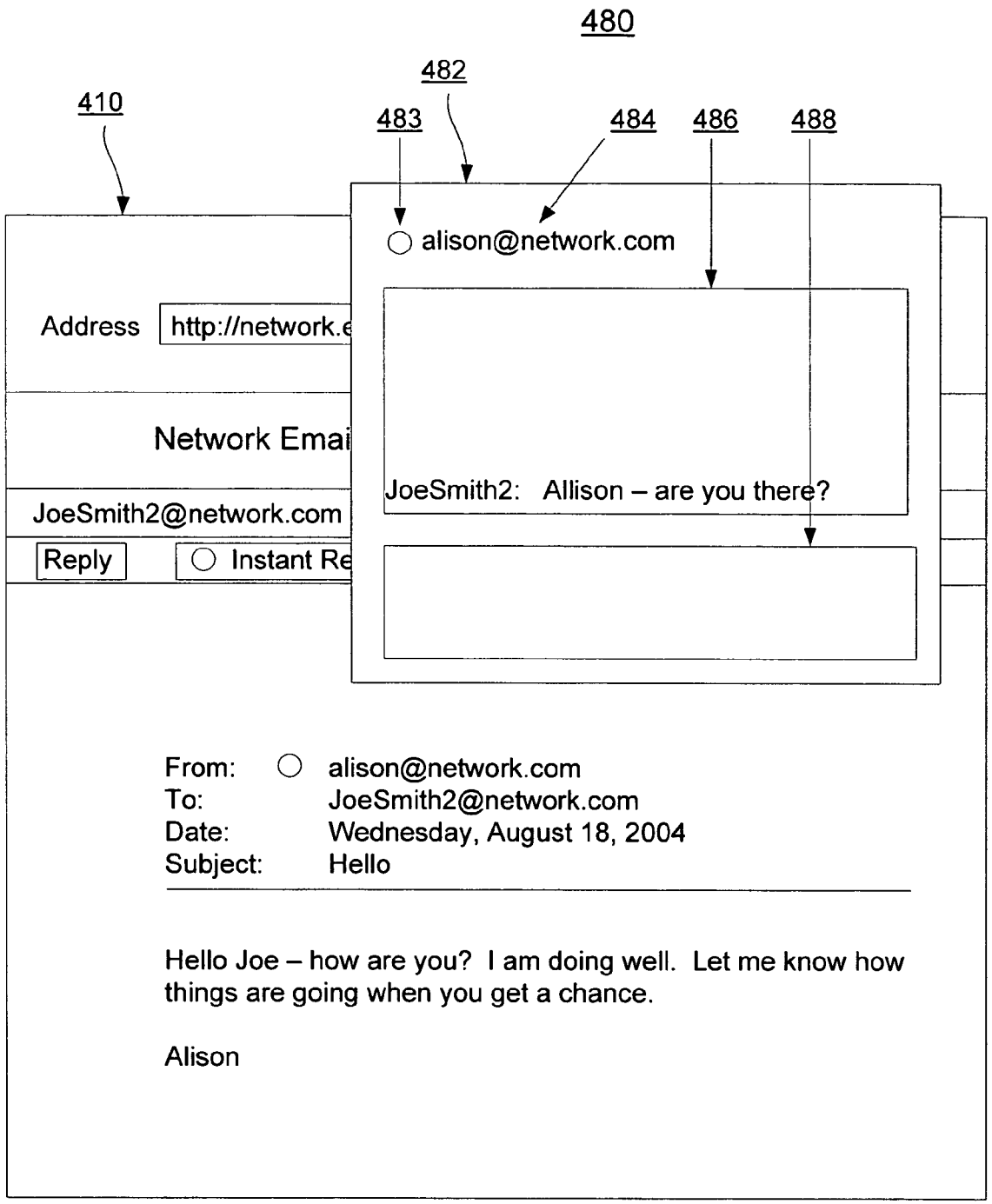
FIG. 4B illustrates another embodiment of an interface for providing an instant response to a mail message.

FIG. 4B illustrates an embodiment of an interface rendered in a web page 480 for providing a conversation window provided over a system interface window. The conversation window is provided to implement an instant reply to an email received by a user. Conversation window 482 includes sender presence indicator 483, sender indicator 484, conversation history window 486 and text entry window 488. Conversation window 482 is an interface used to display the IM conversation between the user and the sender of the message of FIG. 4A. IM conversation window 482 is provided by the IM system after selecting the instant reply link 454 of interface 400. The user may type a message to the sender of the email in text entry window 488. As the sender and user send instant messages to each other, the message text is scrolled up through conversation history window 486. The conversation window can be provided by a local messenger client or browser based client.

Figure 4C:
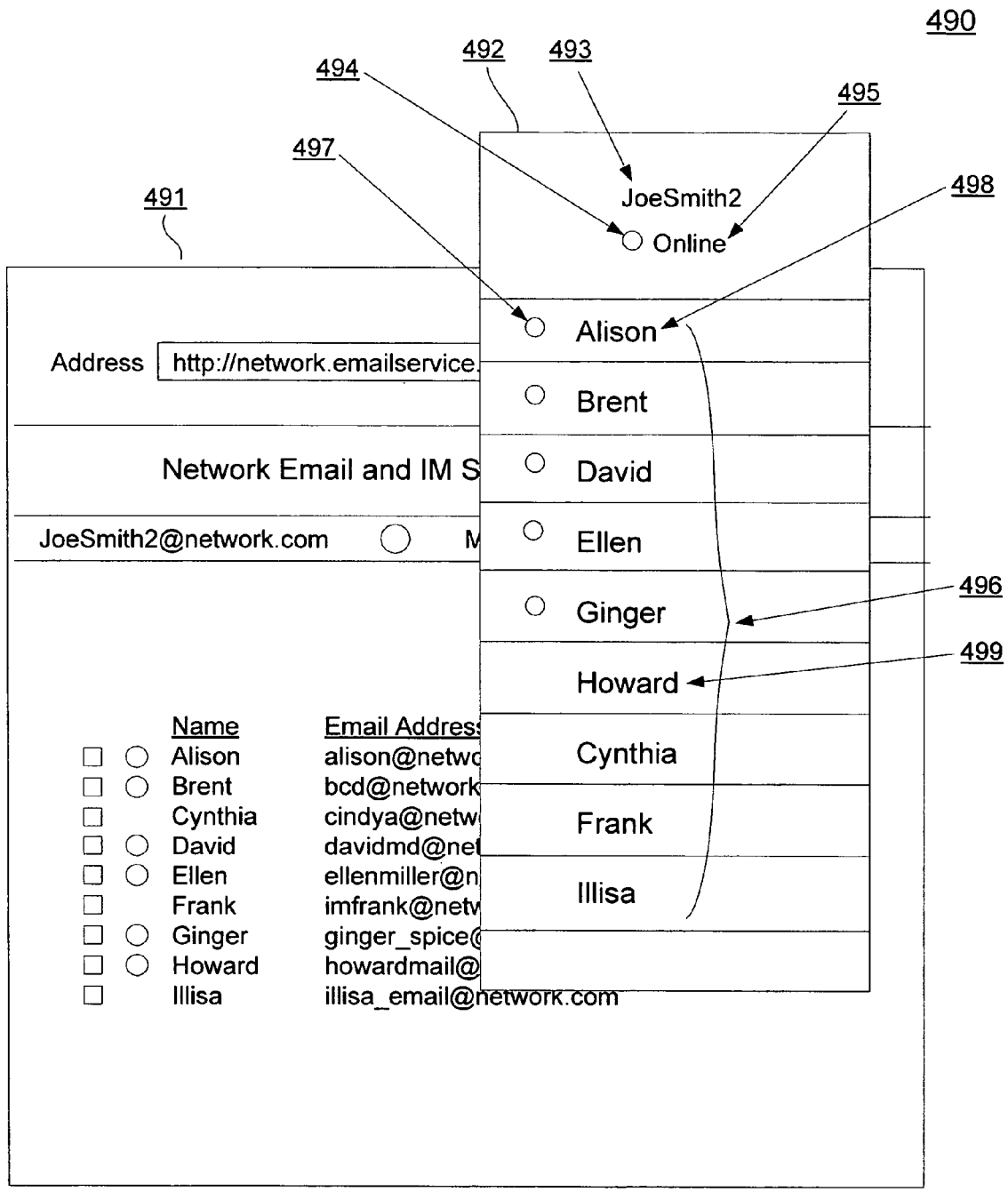
FIG. 4C illustrates another embodiment of an interface for selecting a messenger contact to receive an instant message.

FIG. 4C illustrates an embodiment of an interface rendered in a web page 490 for providing a messenger contact list selection window. Interface page 490 includes interface page 491 and messenger contact list selection window 492. Messenger contact list selection window 492 includes user identifier 493, user status indicator 494, user status message 495, messenger contact list 496, contact presence indicator 497, online contact nickname 498, and offline contact nickname 499. Upon selecting to send an instant message to a contact from an interface page, messenger contact list selection window 492 is displayed. Window 492 provides a list of contacts 496 and their corresponding online indicators 497. A use selects a contact to initiate an IM session with. If the user selects a contact that is currently logged into the IM system such a contact 498, conversation window will appear as illustrated in FIG. 4B. If the user selects a contact not currently logged into the IM system such as contact 499, an offline message will be sent to the contact. Requesting an IM session with a contact is discussed in more detail below.

Figure 5A:
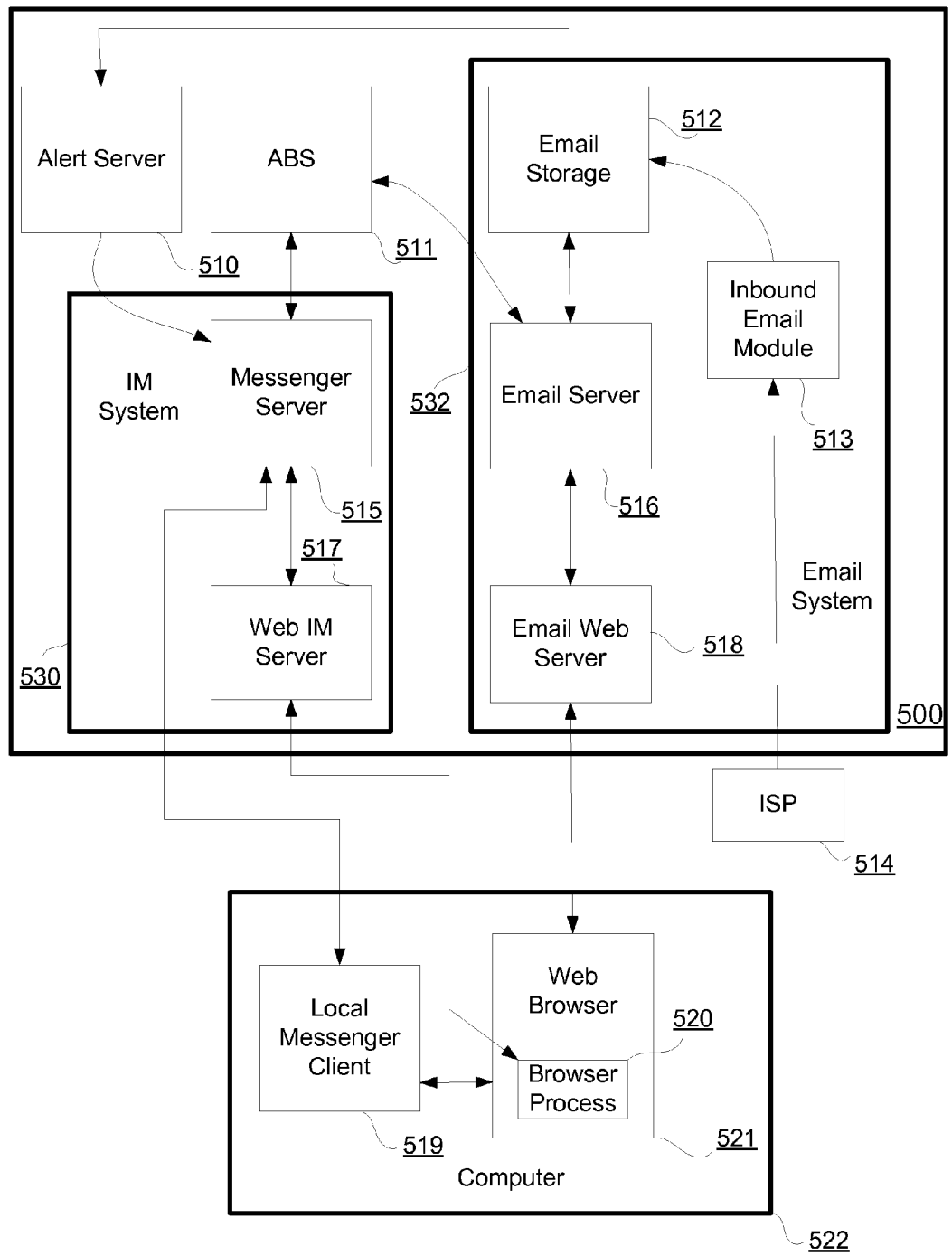
FIG. 5A illustrates one embodiment of a system for integrating an IM and email service.

FIG. 5A illustrates one embodiment of a system 500 for providing an integrated IM and an email service. System 500 includes alert server 510, address book service 511 (ABS). IM system 530 and email system 532. IM system 530 includes messenger server 515 and web IM server 517. Email system 532 includes email storage 512, inbound email module 513, email server 516, and email web server 518.

System 500 interacts with ISP 514 and computer 522. Computer 522 includes local messenger client 519, browser process 520 and web browser 521. In one embodiment, there may be a plurality of computer devices 522 (not shown) in communication with system 500. The operation of each element of FIG. 5 is discussed in more detail below.

The email system interacts with web browser 520 to provide interface pages that implement the email service as well as the IM service. Email system also performs the functions described with respect to email web server 518, email server 516 and email storage 512. The IM system interacts with browser process 520 and local messenger client 519 and performs the functions as described with respect to web IM server 517 and messenger server 515.

Alert server 510 receives alert packages from email server 516 and delivers notifications to messenger server 515. The notifications can include information regarding new emails, IMs and contact list requests received for a user in a domain.

ABS 511 stores user information. User information can include telephone, email, address, user contact lists (e.g., address book, email contact lists, messenger contact lists (or buddy lists), email service lists, and other lists), and other information. Email storage 512 includes data storage devices that store mail content. Inbound email module 513 receives emails for users in the particular domain received from an ISP 514 and provides alerts to alert server 510.

Messenger server 515 handles the instant message features for the IM system. Messenger server 515 brokers connections between local messenger client applications such as local messenger clients and browser based clients implemented on a web browser. Messenger server 515 also handles initial session connections, presence information and notification routing. Messenger server 515 is discussed in more detail below.

Email server 516 provides email data to email web server 518 and sends data to and receives data from ABS 511. In some embodiments, email server 516 maintains a delay login indicator and auto login indicator.

Web IM server 517 is an intermediary between messenger server 515 and browser process 520. Web IM server 517 maintains a user session indicator for users of the service. The indicator may be a flag, for example a NetworkIMSession flag, indicating whether a user is currently signed into messenger server 515 through web IM server 517.

Email web server 518 provides the network page data hyper text markup language (HTML) code. Email server 560 also loads the browser process 520 into the web browser 521, and sends script instructions, such as javascript, to the browser process 520 to implement the IM service.

Local messenger client 519 is a stand-alone program that provides an IM user interface and correlates data received from the messenger server 515 to the corresponding messenger contact. Local messenger client 519 maintains a client messenger session indicator. The indicator may be flag, for example a ClientIMSession flag, indicating whether a user is currently signed into the IM system 530 through the local messenger client 519. The local messenger client 519 may also provide an application program interface (API) to send files, such as email attachment files, to a messenger contact. In some embodiments, calling a method to begin a conversation with a messenger contact, but designating a null value rather than a content identifier, will return a messenger contact selection interface. This allows for an application to retrieve a list of messenger contacts from a local messenger client 519. The user can then choose a messenger contact and begin a conversation.

Web browser 521 renders the network pages hosted by email web server 518. Web browser 521 also communicates with local messenger client 519. In one embodiment, local messenger client 519 provides an "ACTIVEX" API that allows web browser 521 to send and transmit data with local messenger client 519. "ACTIVEX" is set of technologies provided by Microsoft Corporation of Redmond, Wash that allows sharing of information between different applications. In one embodiment, an "ACTIVEX" control is downloaded and embedded into web browser 521. In another embodiment, local messenger client 519 can pre-install the ActiveX control on the computer device running web browser 521. The control operates to call the API in local messenger client 519. When the control in web browser 521 places a call to the API in local messenger client 519, web browser 521 can include a data request in the call. The data request may query for the ClientIMSession flag value, what messenger contacts for a user are currently signed in, a request to log the user out of local messenger client 519 and other actions and information.

In one embodiment, when web browser 521 is described herein as sending a request or query to local messenger client 519, web browser 521 may use an "ACTIVEX" control to send the request or query to the ActiveX API of the local messenger client 519. The API can handle the corresponding local messenger client 519 response as well.

Browser process 520 communicates with IM system 530 and performs tasks associated with the browser based IM client, discussed in more detail below. In one embodiment, the browser process 520 can be implemented with a construct downloaded by email server 560. The construct can enable a document to be embedded into the main HTML document provided by email server 560. Browser process 520 is referred to throughout this disclosure as WebIM or browser process, the terms intended to be interchangeable.

In some embodiments, the construct can be implemented as an inline frame (iframe). An iframe embeds a document into an HTML document. When rendering a document embedded with an iframe, web browser 521 will send document requests to a server URL referred to in the iframe element. After retrieving the document, the document is displayed in the iframe window. In the present case, the document is received, but the iframe window is not displayed. An inline frame can have the form of:

<iframe src="URL" more attributes> alternative content for browsers which do not support frames

</iframe>

A typical HTTP request is made for the iframe to the server URL. The server is not aware of how the document will be used by the requesting web browser 521.

In the system of FIG. 5A, an iframe is embedded in a web page provided by email system 532. The embedded iframe causes web browser 521 to request a document from IM system 530. IM system 530 provides the document to web browser 521, which in turn provides it to the iframe. The iframe may then extract data from the retrieved document as directed by the email system 532. In one embodiment, this is accomplished by instructions in a script file provided by email system 532. The script can be javascript or some other type of script. Thus, in one embodiment, a browser process 520 request or query to IM system 530 can be implemented using an embedded construct, such as an iframe. Additionally, the construct can perform actions based on the retrieved document. For example, the construct can provide visual indicators when alert information is retrieved and a conversation window when a new IM is received.

Browser process 520 sends data to the email system 532 regarding alerts received, which IM service a user is signed into, user presence information, and user contact presence information. The IM server also handles alerts and generates web IM windows and interfaces, including new mail alerts, new IM message alerts, and new conversation windows.

Figure 5B:
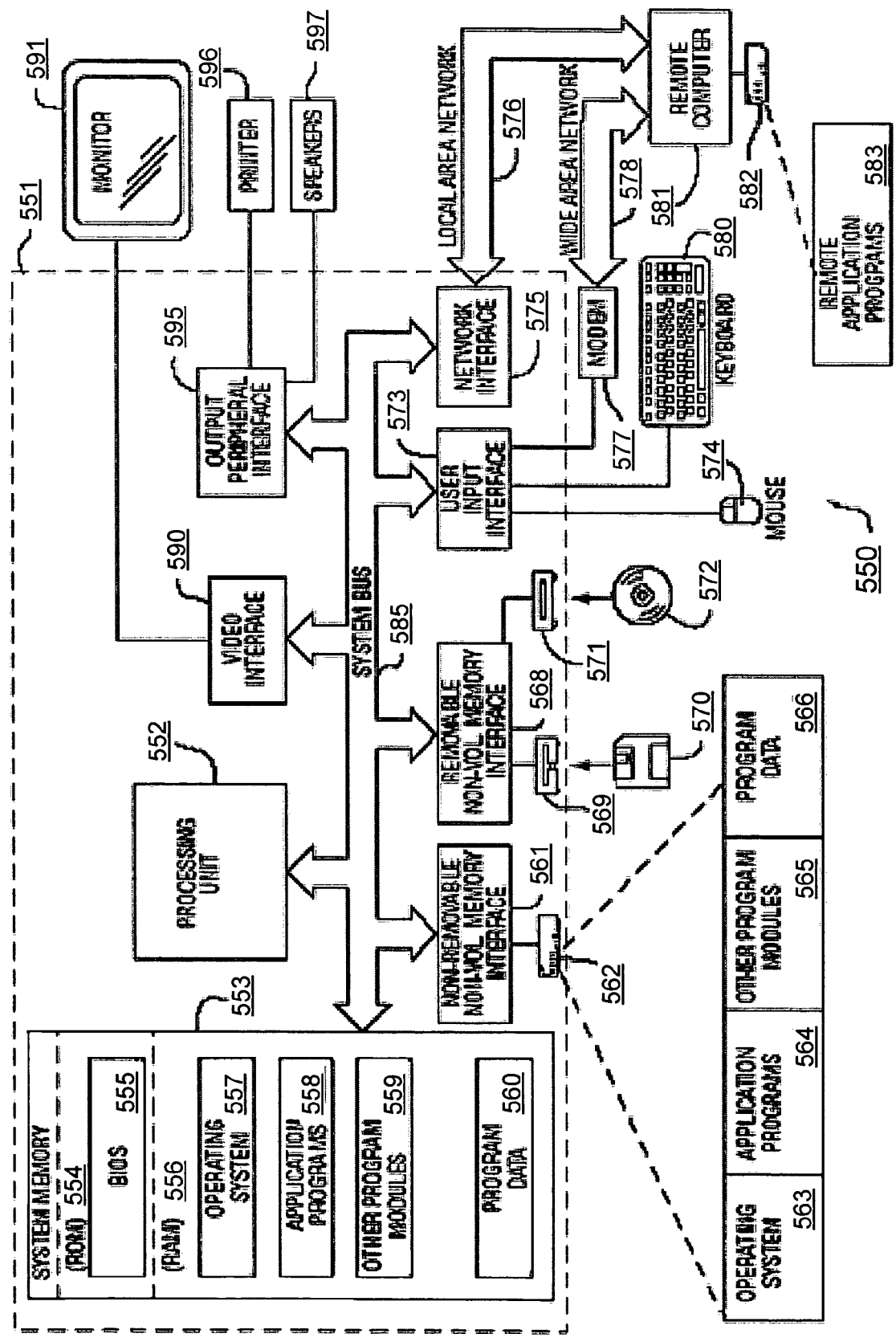
FIG. 5B illustrates one embodiment of a computing device.

System 500 may also include a validation component and an interface component (not illustrated). The validation component allows a user to access the email system and IM system using service account information, discussed in more detail below. The interface component provides an interface having instant messaging status information and instant messaging system access. System 500 may also include an application server providing an application to allow users having a service access account to interact with the email system and the instant messaging system through a common interface such as that rendered in the web pages of FIGS. 1-4C. In one embodiment, system 500 may also include a data store containing server access account information for a plurality of users;

Computing device 522 is described in more detail with respect to FIG. 5B. In some embodiments, computing device 522 as well as the servers, storage devices, and other elements of FIG. 5A can be implemented with the computing system environment of FIG. 5B. FIG. 5B illustrates an example of a suitable computing system environment 550 on which the invention may be implemented. The computing system environment 550 is only one example of a suitable computing environment and is not intended to suggest any limitation as to the scope of use or functionality of the invention. Neither should the computing environment 550 be interpreted as having any dependency or requirement relating to any one or combination of components illustrated in the exemplary operating environment 550.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 5B, an exemplary system for implementing the invention includes a general purpose computing device in the form of a computer 551. Components of computer 551 may include, but are not limited to, a processing unit 552, a system memory 553, and a system bus 585 that couples various system components including the system memory to the processing unit 552. The system bus 585 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 551 typically includes a variety of computer readable media. Computer readable media can be any available media that can be accessed by computer 551 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 551. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 553 includes computer storage media in the form of volatile and/or nonvolatile memory such as read only memory (ROM) 554 and random access memory (RAM) 555. A basic input/output system 556 (BIOS), containing the basic routines that help to transfer information between elements within computer 551, such as during start-up, is typically stored in ROM 554. RAM 555 typically contains data and/or program modules that are immediately accessible to and/or presently being operated on by processing unit 552. By way of example, and not limitation, FIG. 5B illustrates operating system 557, application programs 558, other program modules 559, and program data 560.

The computer 551 may also include other removable/non-removable, volatile/nonvolatile computer storage media. By way of example only, FIG. 5B illustrates a hard disk drive 561 that reads from or writes to non-removable, nonvolatile magnetic media, a magnetic disk drive 569 that reads from or writes to a removable, nonvolatile magnetic disk 570, and an optical disk drive 571 that reads from or writes to a removable, nonvolatile optical disk 572 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 562 is typically connected to the system bus 585 through an non-removable memory interface such as interface 561, and magnetic disk drive 569 and optical disk drive 571 are typically connected to the system bus 585 by a removable memory interface, such as interface 568.

The drives and their associated computer storage media discussed above and illustrated in FIG. 5B, provide storage of computer readable instructions, data structures, program modules and other data for the computer 551. In FIG. 5B, for example, hard disk drive 562 is illustrated as storing operating system 563, application programs 564, other program modules 565, and program data 566. Note that these components can either be the same as or different from operating system 557, application programs 558, other program modules 559, and program data 560. Operating system 563, application programs 564, other program modules 565, and program data 566 are given different numbers here to illustrate that, at a minimum, they are different copies.

A user may enter commands and information into the computer 20 through input devices such as a keyboard 580 and pointing device 574, commonly referred to as a mouse, trackball or touch pad. Other input devices (not shown) may include a microphone, joystick, game pad, satellite dish, scanner, or the like.

These and other input devices are often connected to the processing unit 552 through a user input interface 573 that is coupled to the system bus, but may be connected by other interface and bus structures, such as a parallel port, game port or a universal serial bus (USB). A monitor 591 or other type of display device is also connected to the system bus 585 via an interface, such as a video interface 590. In addition to the monitor, computers may also include other peripheral output devices such as speakers 597 and printer 596, which may be connected through a output peripheral interface 590.

The computer 551 may operate in a networked environment using logical connections to one or more remote computers, such as a remote computer 581. The remote computer 581 may be a personal computer, a server, a router, a network PC, a peer device or other common network node, and typically includes many or all of the elements described above relative to the computer 551, although only a memory storage device 582 has been illustrated in FIG. 5B. The logical connections depicted in FIG. 5B include a local area network (LAN) 576 and a wide area network (WAN) 578, but may also include other networks. Such networking environments are commonplace in offices, enterprise-wide computer networks, intranets and the Internet.

When used in a LAN networking environment, the computer 551 is connected to the LAN 576 through a network interface or adapter 575. When used in a WAN networking environment, the computer 551 typically includes a modem 577 or other means for establishing communications over the WAN 578, such as the Internet. The modem 577, which may be internal or external, may be connected to the system bus 585 via the user input interface 573, or other appropriate mechanism. In a networked environment, program modules depicted relative to the computer 551, or portions thereof, may be stored in the remote memory storage device. By way of example, and not limitation, FIG. 5B illustrates remote application programs 583 as residing on memory device 582. It will be appreciated that the network connections shown are exemplary and other means of establishing a communications link between the computers may be used.

Figure 6:
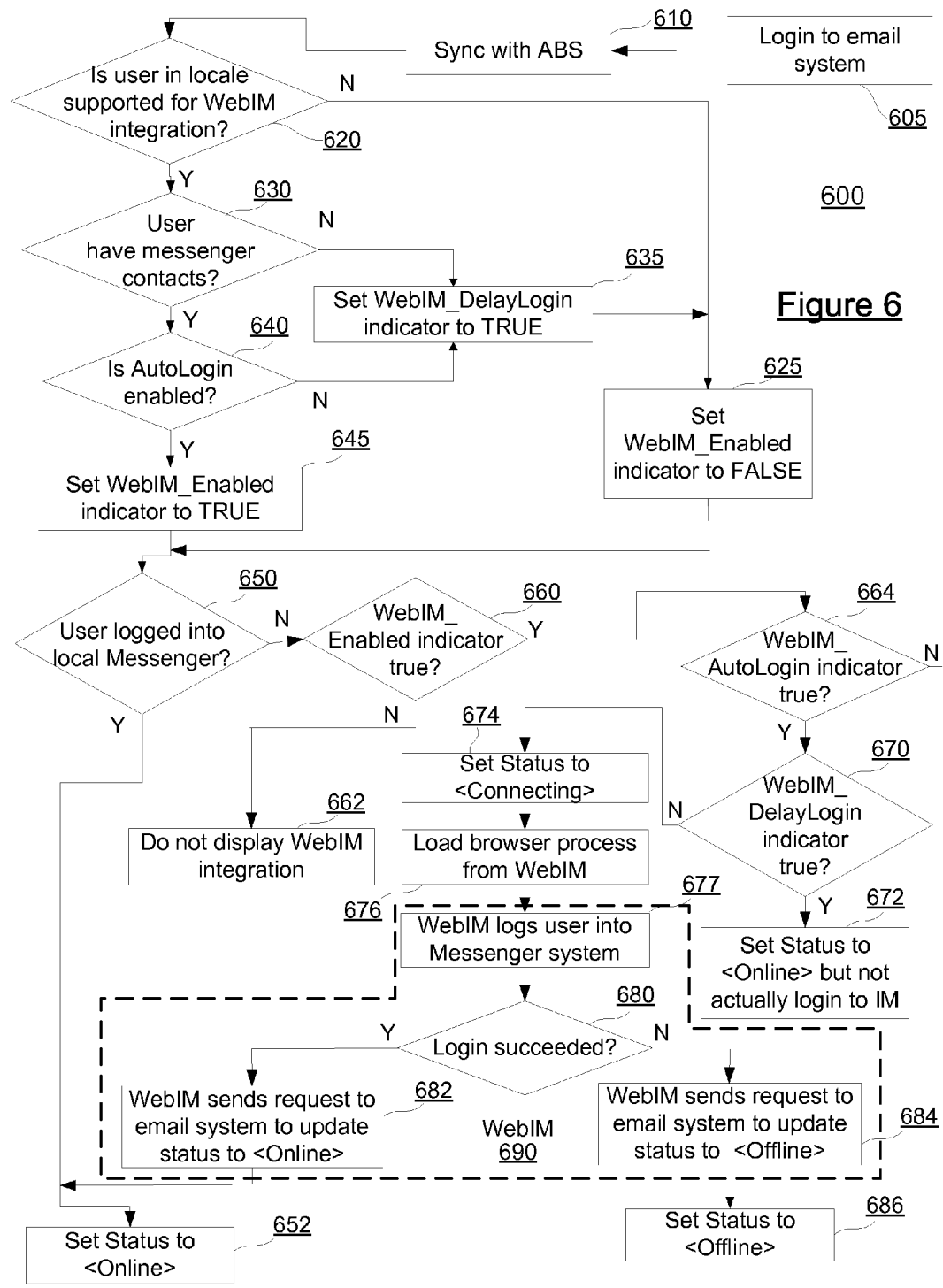
FIG. 6 illustrates one embodiment of a method for integrating login for an IM service and email service.

To access the services provided by the system of FIGS. 5A and 5B, a user must first login to the system. As discussed above, only one login is required to access both email system 532 and IM service 530. In one embodiment, service access account information is stored in a data store (not shown) within system 500 or accessible by system 500 of FIG. 5A. A user having a service access account within the service account information may have access to the email system 352 and IM system 350. FIG. 6 illustrates one embodiment of a method 600 for integrating a login sequence for an email and IM service.

Method 600 begins at step 605 wherein the user logs into the email system 532. Only one login is required to email system 432 and IM system 530 by the user. The login step of step 605 is a validation for users before access to the email system 352 and IM system 350 is granted. The validation is performed by a validation component (not illustrated) of the system 500 of FIG. 5. Login to the email system 532 involves receiving user identification information, such as a user identifier and a password associated with the identification information, through an interface. In one embodiment, the login information can be received through an interface provided by web browser 521 in communication with email system 532. Once received, the login information is sent to email system 532. Email system 532 confirms the user identifier is valid and the password corresponds to a stored password associated with the user identifier. In one embodiment, email system 532 confirms the user identifier is valid by requesting a confirmation from a user validation service (not shown in FIG. 5). The user validation service confirms the user is valid.

Once the user is logged in, email system 532 sends a synchronization request to ABS 511 at step 610. The synchronization is performed to update email system 532 of user data changes persisted while the user was not logged in. In one embodiment, the synchronization request includes the user identifier and a timestamp indicating the last time the user information was retrieved by email system 532. With this information, ABS 511 can retrieve information for the user that has changed since the last synchronization by email system 532. Upon receiving the request, ABS 511 retrieves the user contact lists and other data associated with the user identifier. ABS 511 then sends the requested user information along with a timestamp to email system 532 at step 630.

The email system 532 determines if the user is in a locale that supports the integrated WebIM at step 620. In one embodiment, the integration of the email and IM service may not be possible as determined by the rules and regulations where the user is accessing the service. In one embodiment, a server administrator may wish to limit access for reason or another. In one embodiment, the service administrator may be a person or a machine, such as a computer. If integrated email and IM service is not possible at the locality where the user is attempting to login, then operation continues to step 625. If the integration is supported, operation continues to step 630.

At step 630, email system 532 determines if the messenger contact list associated with the user identifier includes one or more messenger contacts. If the messenger contact list contains no contacts, a WebIM delay login indicator for the user is set to indicate a delay at step 635 and operation then continues to step 625. In one embodiment, the WebIM delay login indicator can be implemented as a flag, for example a DelayLoginFlag. If email system 532 does not already have a cached version of the messenger contact list of the user, email system 532 may retrieve the list from ABS 511 in step 610.

At step 630, if the user messenger contact list has one or more contacts, operation continues to step 640 wherein the email system 532 determines whether or not an automatic login, or WebIM auto login indicator, is enabled for the user. The WebIM auto login indicator for a user indicates whether email system 532 should automatically log the user into IM system 530 after email login is complete. The automatic login indicator may be stored by email system 532, and may take the form of a flag, such as an AutoLogin flag. If automatic login is not enabled, operation continues to step 635. At step 635, the WebIM delay login indicator is set to true. Operation then continues from step 635 to step 625 wherein a WebIM enabled indicator is set to "false". The WebIM enabled indicator indicates whether the integrated email and IM service will be made available to the user for the current login experience. At step 625, the WebIM enabled indicator is set to reflect that the integrated email and IM service will not be made available to the user. Operation proceeds from step 625 to step 650.

At step 640, if automatic login is enabled, operation continues to step 645 wherein a WebIM enabled indicator is set to true. This setting for the indicator represents that the integrated email and IM service shall be provided to the current user. Operation then continues to step 650.

At step 650, the email system 532 determines if the user is signed into local messenger client 519 at step 650. In one embodiment, several steps are performed to make this determination. Web browser 521 sends a session query to local messenger client 519. The session query can be implemented by an "ACTIVEX" control loaded into web browser 521 that calls an "ACTIVEX" API in the local messenger client 519. The query requests the value of the client messenger session indicator and includes the user identifier for the user signed into the email service. Local messenger client 519 receives the query, determines if the user is signed into local messenger client 519, and provides a response to web browser 521. Web browser 521 receives the response and provides the client messenger session indicator value and user indicator in a response to email system 532. Email system 532 then determines if the user is signed into IM system 530 through local messenger client 519.

At step 650, if the user is signed in through local messenger client 519, operation continues to step 652 where email system 532 sets the user presence to online. The user presence can then be provided in the service pages as indicated in the interfaces of FIGS. 1-4C. Subsequent tasks involving the IM service will be implemented through the local messenger client as long as the user is accessing the IM system 530 through the local messenger client.

If at step 650 email system 532 determines the user is not logged in through local messenger client 519, operation continues to step 660. At step 660, email system 532 determines whether the WebIM enabled indicator is set to true. The WebIM enabled indicator was set earlier in the present method and stored by email system 532. If the WebIM enabled indicator is set to true, operation continues to step 662. If the WebIM enabled indicator is set to false, operation continues to step 664. At step 662, email system has determined that the integrated email and IM service can not be used and shall not be implemented for the current session. At step 664, email system determines the WebIM auto login indicator value. If the WebIM auto login has a value set to true, operation continues to step 670. Otherwise, operation continues to step 684. At step 684, the user will not be automatically logged in and the user's presence will be set to "offline". The WebIM or browser process sends a request to email system 532 to update the user status to "offline" at step 684. Email system 532 then sets the user status to "offline".

At step 670, email system 532 accesses and determines the value of a WebIM delay login indicator. If the WebIM delay login indicator requires a delayed user login (i.e., has a value of true) at step 670, email system 532 sets the user presence to online but the user is not logged into IM system 530 at step 672. The WebIM delay login indicator indicates the user has not added any messenger contacts to his or her IM account. A user who has no messenger contacts has not previously accessed the IM service (contacts are required to initiate an IM conversation). Listing the user as online allows others to initiate conversations with the user. However, not logging the user in reduces unneeded traffic by not tying up login resources for a user who may not be interested in the IM service.

If at step 670 the WebIM delay login indicator does not indicate login should be delayed, the presence status for the user is set to "connecting" at step 674 and browser process 520 is loaded into web browser 521 at step 676. In one embodiment, browser process 520 is loaded from email system 532 to web browser 521. Next, browser process attempts to log the user into the IM system 530 at step 677. In one embodiment, the login process begins with browser process 520 sending a login request to IM service 530. The browser process login can include the user identifier and password used to login to the email service at step 605.

In one embodiment, the login sequence to the IM service can be performed as follows. Web IM server 517 receives the login request from browser process 520. Web IM server generates a messenger server login request and sends the request to Messenger server 530. Messenger server 530 receives the messenger server login request and sends a user confirmation request to ABS 511. In another embodiment, the user confirmation request is sent to a user validation service. The user confirmation request can include the user identifier and password. If login information is valid, ABS 511 or the user validation service confirms the user identifier exists. The Messenger server then calls ABS and ABS sends a response to IM system 530 containing the user identifier and a messenger contact list associated with the user identifier. Otherwise, ABS 511 returns an error message to IM system 530. IM system 530 receives the ABS 511 response and determines if any of the contacts in the messenger contact lists are online. IM system 530 provides the user identifier, the user messenger contact list, and an indication of the presence for each contact to web IM server 517. Web IM server 517 than generates a response including the received information and sends the response to browser process 520. Browser process 520 then forwards the information to email system 532.

As indicated by group 690 of method 600, steps 677, 680, 682 and 684 are performed by WebIM, or the browser process. At step 680, WebIM (browser process 520) determines whether the login was successful. If the login was successful, the WebIM sends a request to email system 532 to update the IM status to "online" at step 682. Operation then continues to step 652 wherein email system 532 sets the user presence to online at step 652. If login is not successful, the WebIM client sends a request to email system 532 to update the user status to "offline". Email system 532 then updates the status to offline at step 686.

Figure 7:
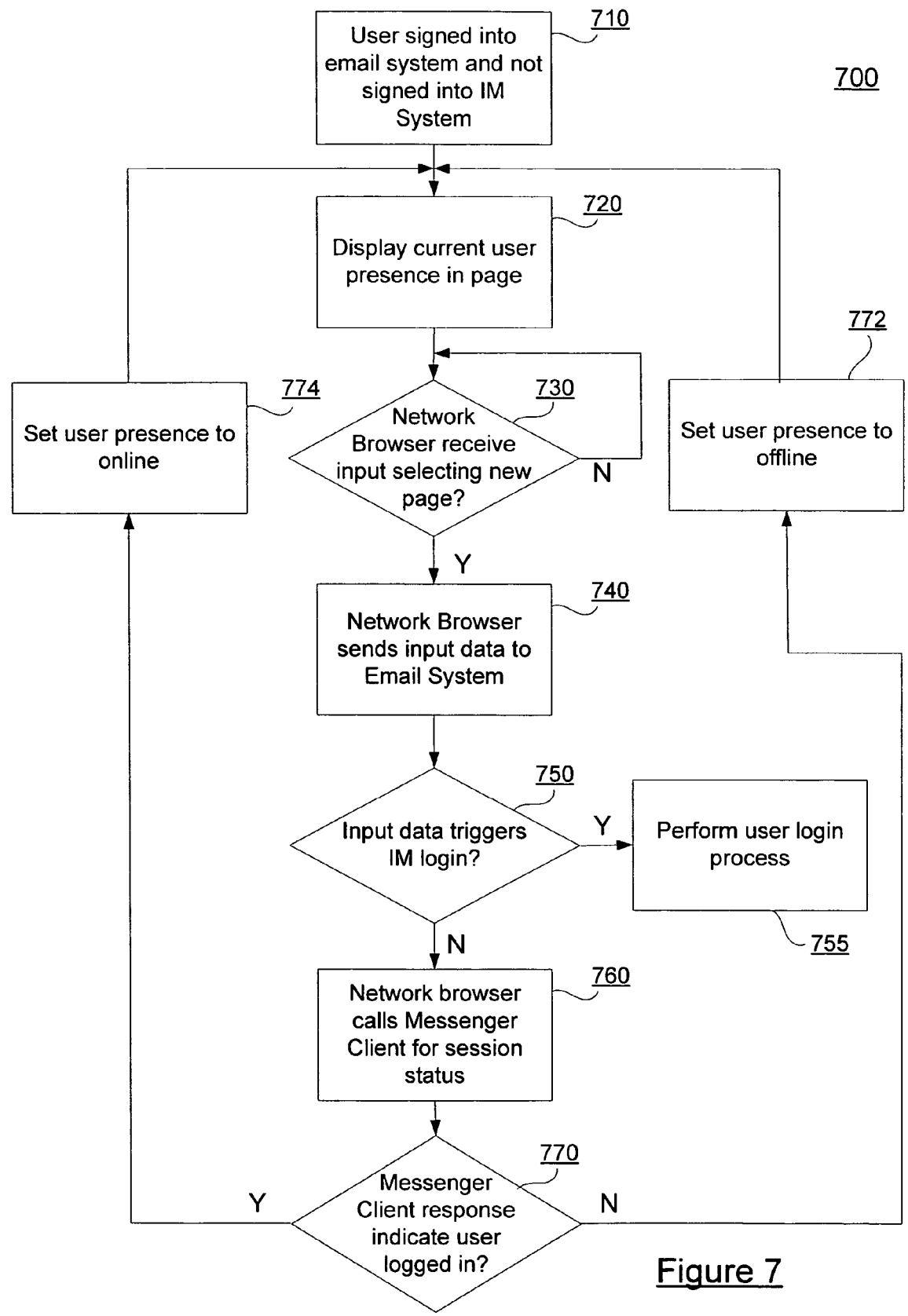
FIG. 7 illustrates one embodiment of a method for monitoring a local IM client connection.

In one embodiment, if a user is logged into email system 532 but not IM system 530, email system 532 will monitor for a local messenger client 519 connection to maintain an accurate presence status. Since the client connection can change over time, the email system 532 can continually check the status of the local messenger client. A method 700 for monitoring a local messenger client connection is illustrated in FIG. 7. A user is signed into the email system 532 but not signed into the IM system 530 at step 710. The user may or may not be signed into local messenger client 519. Web browser 521 loads an interface having the current user presence at step 210. Web browser 521 then determines if input is received that requires a new interface to be loaded at step 730. If no new interface selection is received at step 730, operation remains at step 730 until such input is received.

Once input is received at step 730 that requires a new interface to be loaded by web browser 521, web browser 521 sends the input to email system 532 at step 740. Email system 532 determines if the interface page to be loaded triggers an IM service login at step 750. In one embodiment, interfaces that trigger an IM service login include interfaces for sending a new instant message, sending an instant reply, and adding a contact. These interface pages trigger an IM service login because they provide IM services. If email system 532 determines that the requested interface page requires an IM service login, operation continues to step 755. At step 755, the system will perform a user login process. In one embodiment, the user login process can be performed as discussed above.

If email system 532 determines that the new interface does not trigger an IM session login, operation continues to step 760 wherein web browser 521 calls local messenger client 519 for user session status. Local messenger client 519 receives the call and provides the users session status to web browser 521. Web browser 521 provides the session status to email system 532. If at step 770 the response indicates the user is logged into local messenger client 519, email system 532 sets the user presence to online at step 774. If the response indicates the user is not logged into local messenger client 519 at step 770, email system 532 sets the user presence to offline at step 772. Operation from steps 774 and 772 then proceed back to step 720.

Figure 8:
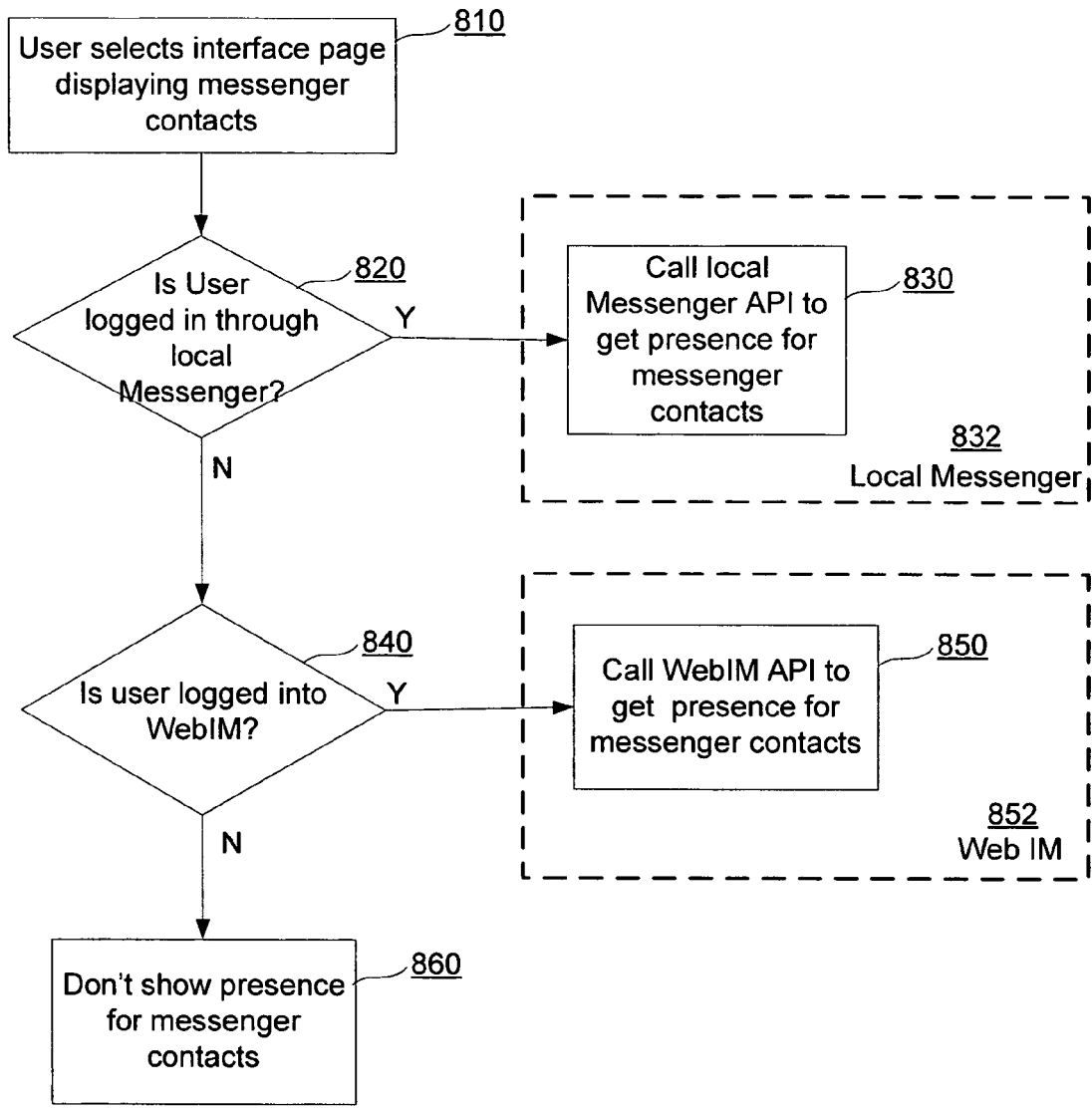
FIG. 8 illustrates one embodiment of a method for providing presence information for messenger contacts.

In addition to determining user presence status as discussed in method 700, the IM system 530 can determine the presence information of messenger contact users as well. The contacts can be displayed on interface pages providing email or IM system information. FIG. 8 illustrates one embodiment of a method 800 for providing presence information for user contacts. Method 800 begins with step 810 wherein the user selects an interface page displaying messenger contacts having contact presence information. In one embodiment, a page with contact presence information may include an inbox, read message, contact list, or similar page provided by email system 532.

Next, at step 820 the email system 532 must determine if the user is signed into the local messenger client. In one embodiment, email system 532 determines this by sending instructions to web browser 521 in a script file. After receiving the script file, web browser 521 sends session query information to local messenger client 519. In one embodiment, email system 532 directs the web browser 521 to send the query using an ActiveX control to call the ActiveX API implemented in the local messenger client 519. The session query to local messenger client 519 includes the user identifier. The local messenger client 519 API receives the call and determines whether the user is currently signed in to local messenger client 519. In one embodiment, the ClientIMSession flag is accessed to make this determination. The ActiveX API then provides a response to web browser 521. The response includes the user identifier and the login status for the user with local messenger client 519. Web browser 521 receives the response and forwards the session information to email system 532. Email system 532 receives the session information from web browser 521 and determines whether the user is logged into local messenger client 519.

If at step 820 email system 532 determines the user is signed into local messenger client 519, operation continues to step 830. As indicated by marker 832, step 830 is performed by local messenger client. If email system 532 determines the user is not logged into IM system 530, operation continues to step 840. If the user is logged into the IM system 530 using the local messenger client, operation continues step 830 where a call is made to the local messenger API to get presence information for the messenger contacts. In on embodiment, web browser 521 places the call and retrieves the presence for the user messenger contacts. In one embodiment, email system 532 sends instructions to web browser 521 to retrieve the presence of the messenger contact list contacts.

At step 840, email system 532 can send instructions to browser process 520 to determine whether the user is signed into IM system 530 through the browser based client or the local messenger client. In one embodiment, the instructions are sent in a script file, for example a javascript file. Browser process 520 then requests user session information from IM system 530. The session information request includes the user identifier. The IM system 530 then provides a response consisting of the network messenger status for the user to browser process 520. The response can include data such as the user identifier and the login status of the user with IM system 530. Browser process 520 then provides the data to email system 532. Email system 532 then determines whether the user is logged into IM system 530 from the user network messenger session status.

If email system 532 determines the user is logged in through web IM server 517, operation continues to step 850 wherein a call is made to a WebIM API to get presence information for messenger contacts. In one embodiment, the API is called by browser process 520 as indicated by marker 852. Email system 532 can provide instructions in a script file to browser process 520 to retrieve the messenger contact presence information and return the information to email system 532. The contact presence indicators can then be provided in the network page provided by email system 532.

If the user is not logged in through IM system 530 at step 840, presence information is not provided for messenger contacts displayed in the interface page. In one embodiment, the response received from IM system 530 by browser process 520 is sent to email system 532.

Once the presence information is retrieved, web browser 521 provides the contact presence information to email system 532. The contact presence indicator for each messenger contact can then be incorporated into pages provided by email system 532.

Figure 9:
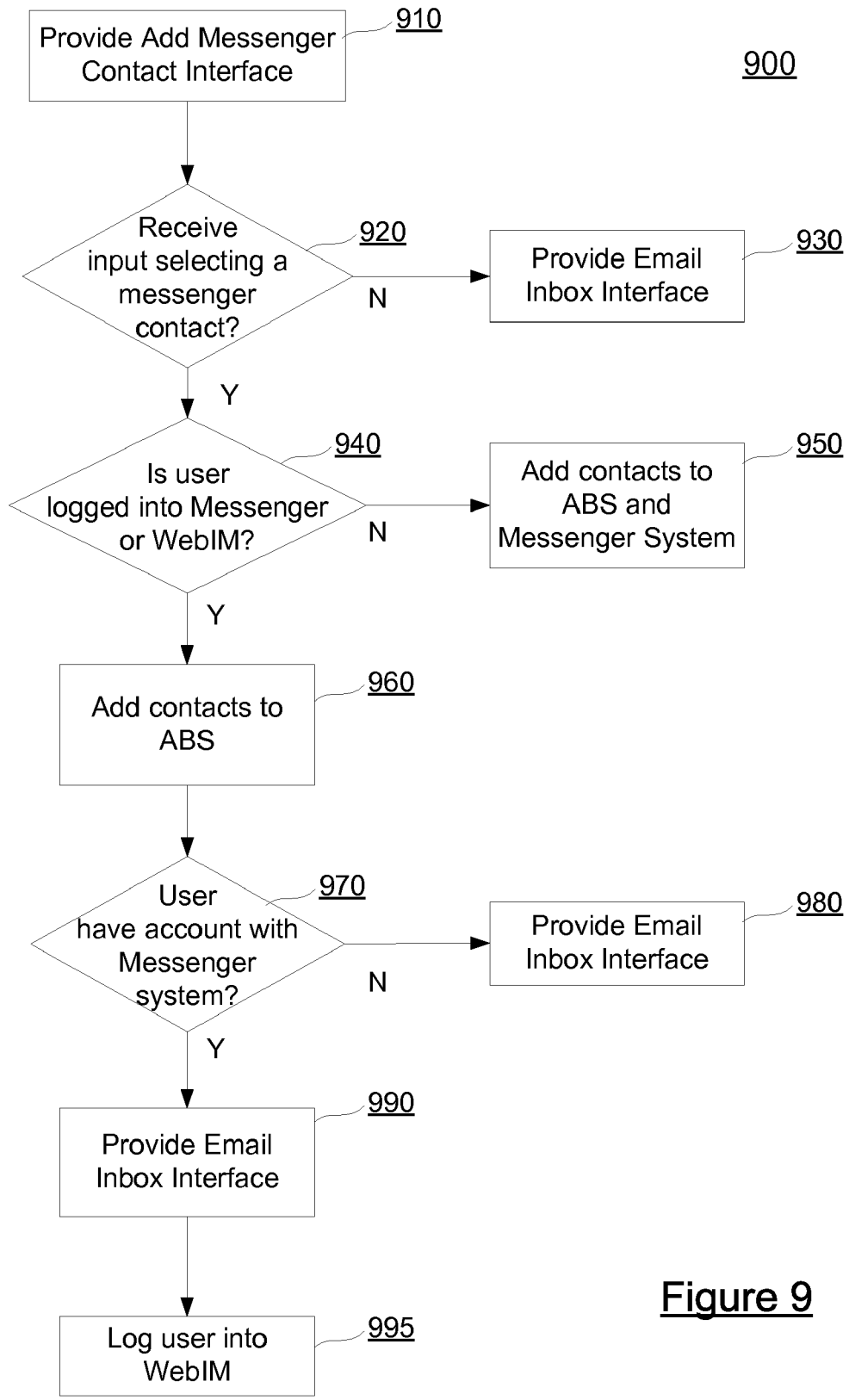
FIG. 9 illustrates one embodiment of a method for adding messenger contacts.

When integrating an email service and an IM service, a user may wish to make contact changes by adding, deleting or modifying contacts. This may include adding contacts from an email list to a messenger contact list. FIG. 9 illustrates a method 900 for making contact changes in an integrated IM and email service. Method 900 begins at step 910 wherein web browser 521 loads an Add messenger contact interface page from email system 532. Next, web browser 521 determines if an input was received selecting a messenger contact at step 920. In one embodiment, input may indicate a user marked a contact selection icon 284 in network page 210. If no qualifying input is received, operation continues to step 930 wherein email system 532 provides an email inbox interface page to web browser 521 at step 930. Optionally, operation remains at step 920 until input selecting a contact is received. If a contact is selected at step 920, the email system 532 determines if the user is logged into a local messenger client or browser based client. The process for this is similar to that discussed above with respect to method 800. If the user is signed in to either the local messenger client or WebIM client, the selected contacts are saved to ABS 511 and IM system 530 at step 950. In one embodiment, multiple email contacts can be saved as messenger contacts after receiving a single input from a user. The messenger contacts are stored to the IM system 530 through the client application used to access the IM system 530 (i.e., either the local messenger client or the browser based client). In one embodiment, the messenger contact changes are sent to ABS 511 by email system 532 along with the user identifier associated with the changes.

If the user is not logged into the IM service, the contacts are added to the ABS 511 at step 960. Next, the IM service determines if the user has an account with the messenger service at step 970. In one embodiment, this determination is made by placing a call to the messenger server and requesting confirmation of the user identifier associated with the user. If the messenger server has an account matching the user identifier, the user has an account with IM system 530. If no account is found, operation continues to step 980 wherein web browser 520 loads an email inbox interface from email system 532. If the user does have an account with IM system 530, operation continues to step 990 wherein email system 532 provides an email inbox interface. The user is then logged into WebIM client at step 995.

Figure 10:
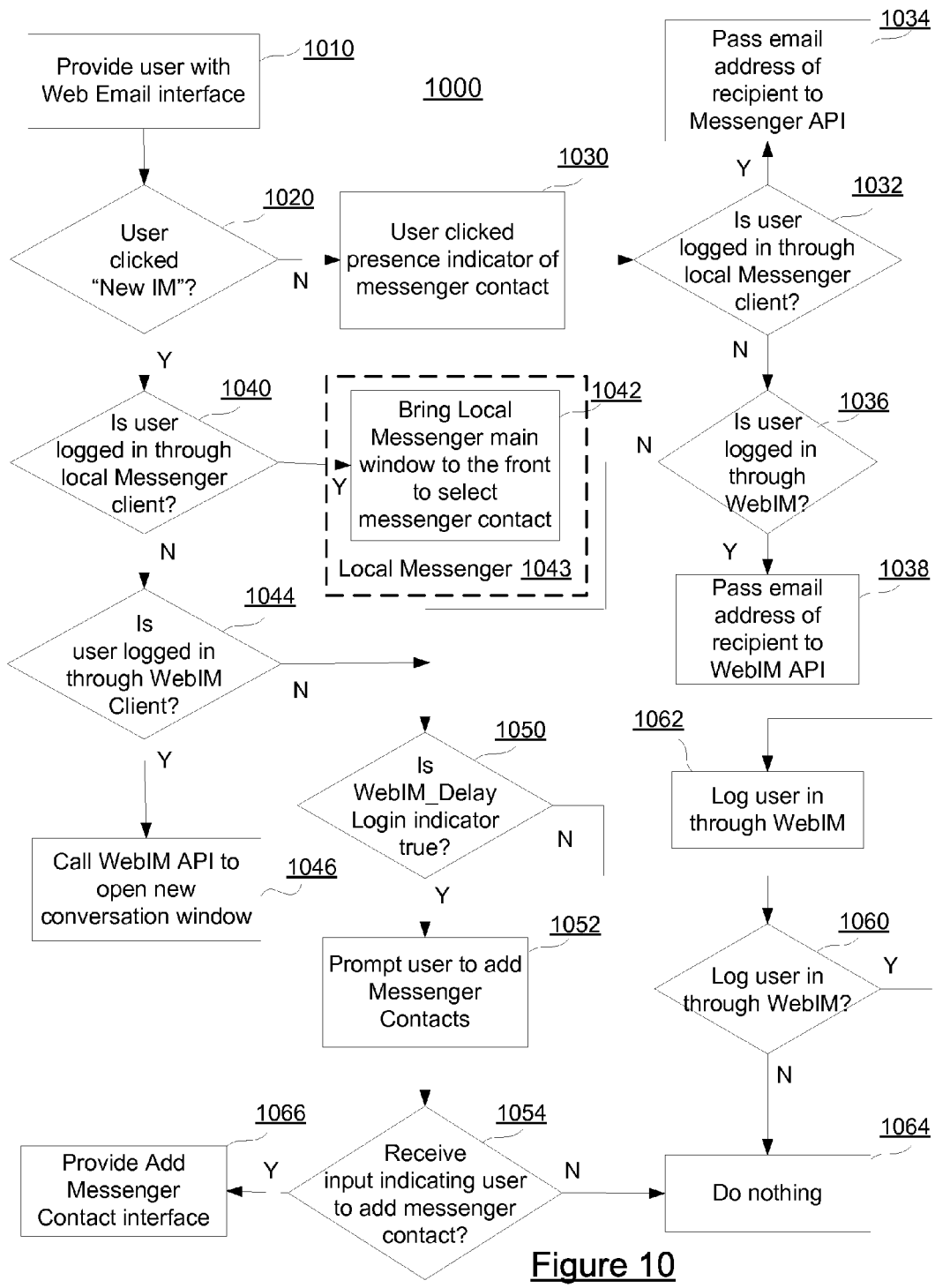
FIG. 10 illustrates one embodiment of a method for sending an instant message.

Once a user has configured a messenger contact list, the user may send an instant message through an interface of the integrated IM and email system. An instant message can be initiated in several ways, for example clicking a "new instant message" button or selecting a contact presence indicator in a contact list or inbox. FIG. 10 illustrates one embodiment of a method 1000 for sending an IM from an integrated IM and email service. Method 1000 begins at step 1010 wherein web browser 521 loads an email interface page from email system 532. The system then receives an input indicating an instant message should be sent. If the input is a selection of a "new IM' at step 1020, operation continues to step 1040. Otherwise, the user has selected a contact presence indicator, or some other element associated with a user, to initiate sending an IM to a user and operation continues to step 1030. Email system 532 then determines if the user is logged into local IM system 530 at step 1040. If the user is logged into local IM system 530, operation continues to step 1042 wherein the local messenger client main window is brought to the front to select messenger contact. As indicated by marker 1043, the local client messenger performs the step of claim 1042. If the user is not logged into local messenger client, IM system determines if the user is logged into a the IM system through a browser based client (WebIM) at step 1044. If the user is signed into the WebIM, operation continues to step 1046 wherein a call is made to WebIM API to open a new conversation window.

If at step 1044 email system 532 determines that the user is not logged into WebIM, the email system 532 determines whether the WebIM delay login indicator is true or not at step 1050. As discussed above, email system 532 has access to the WebIM delay login indicator associated with the user. If email system 532 determines the WebIM delay login is true and the messenger contact list contains no messenger contacts at step 1050, operation continues to step 1052. At step 1052, email system 532 loads an interface in web browser 521 that prompts the user to indicate if he or she wants to add messenger contacts. At step 1054, if the web browser 521 receives input to add a messenger contact to the messenger contact list, the input is sent to email system 532 and an Add messenger contact interface is provided to web browser 521 from email system 532 at step 1066. If web browser 521 does not receive a request to add a messenger contact to the messenger contact list, operation continues to step 1064 where email system 532 takes no further action.

If at step 1050 the WebIM delay login indicator is false, email system 532 has determined that the user has messenger contacts but is not logged into the system. Operation continues to step 1060 wherein email system 532 determines whether the user should be logged into WebIM. In one embodiment, email system 532 prompts the user to determine if the user wishes to be logged in. If the user should not be logged in at step 1060, operation continues to step 1064 where no further action is taken. If the user should be logged in at step 1060, operation continues to step 1062 wherein the user is logged into the IM system 530 through WebIM.

Returning to step 1020, if web browser did not receive an input selecting a "new IM", then the browser received a selection of a contact presence indicator. Thus, the user has selected a contact with which to have a conversation. Operation continues to step 1032 wherein email system 532 determines if the user is logged into the local messenger client. If the user is logged into a local messenger client, operation continues to step 1034 where the email address of the recipient is passed to a local messenger client API. The local messenger will then transmit the information to IM system 530. IM system 530 will broker a conversation between the user and the recipient. If the user is not logged into the local messenger client at step 1032, the system determines if the user is logged into WebIM at step 1036. If a user is logged into WebIM, the email address of the selected recipient is passed to a WebIM API at step 1038. The API receives the information and sends a request for a new conversation to IM system 530. If the user is not logged into WebIM, operation continues to step 1050 and proceeds as discussed above.

Figure 11:
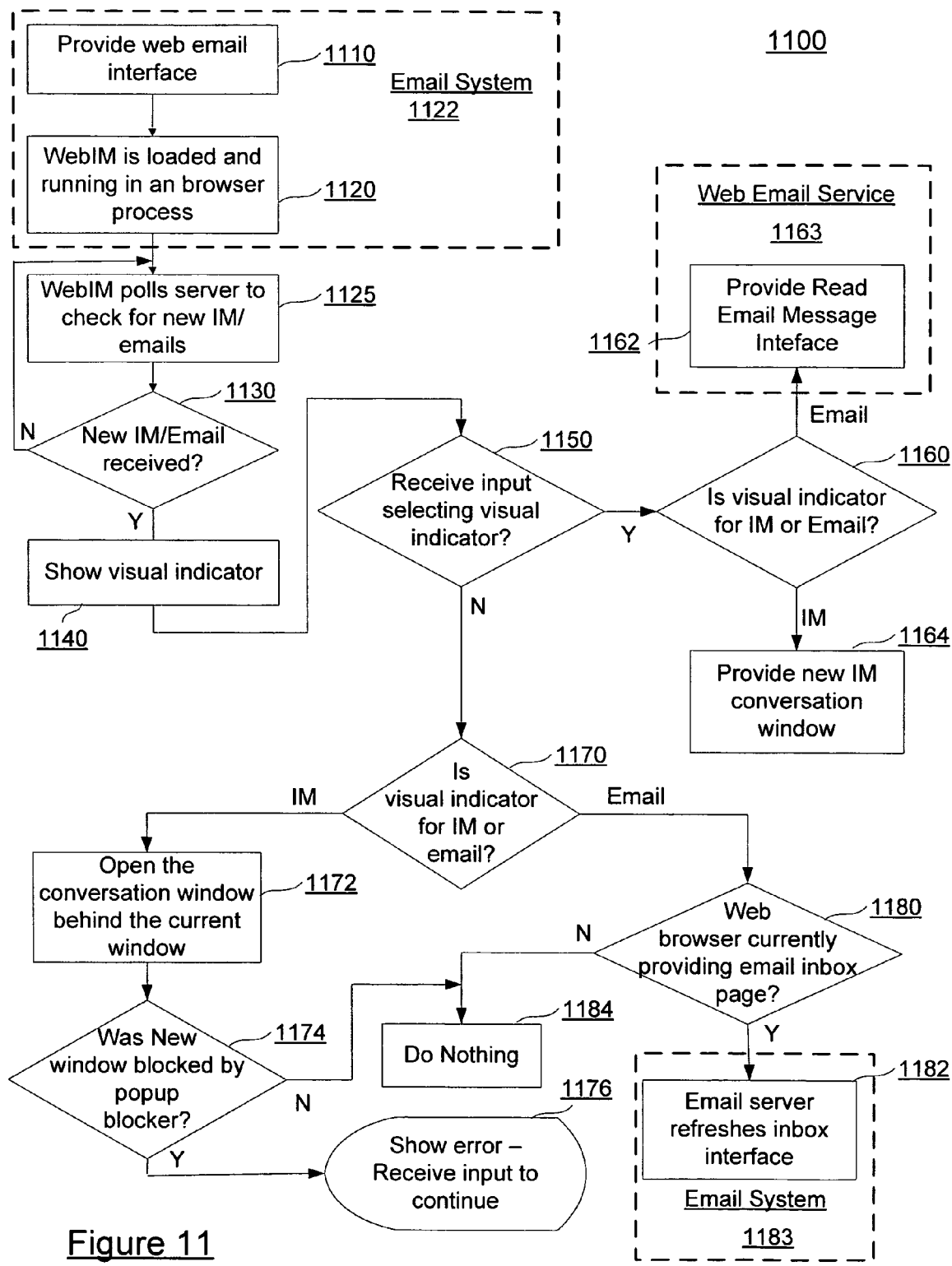
FIG. 11 illustrates one embodiment of a method for processing IM and email alerts.

A user can be notified of new emails and IM requests through a notification process provided by the integrated email and IM service. In one embodiment, an alert is generated when new emails, instant messages and other data is received by the messenger server for a user. Alert retrieval is performed by web IM server 517. Since web IM server 517 does not have continuous communication with IM system 530 that originally receives the alerts, web IM server 517 polls IM system 530 to determine if an alert has been received. FIG. 11 illustrates a method 1100 that provides a instant message alerts for data delivery events.

Method 1100 begins with the system providing a web email interface at step 1110. As shown in method 1100, the email system 352 performs steps 1110, 1120 and 1183. At some point, the WebIM client is loaded and running in a browser process. The WebIM client, or browser process, polls the server at step 1125 to check for new IM and emails. The polling consists of sending an alert request to the messenger server and inspecting the response for information regarding received alerts. The alert request may contain the address of the sender as well as the user identifier. The alert response may include the user identifier, text information, and other information regarding an alert for the user. Browser process 520 then determines at step 1130 whether any response received contains new alerts for the user. If no alerts are received, operation returns to step 1125 where the messenger server polling process repeats. If an alert is indicated in a response from IM system 530, operation continues to step 1140.

At step 1140, browser process 520 provides a visual indicator, such as a toast, regarding the new instant message. In one embodiment, a toast is a visual indicator that an alert has been received for a user. The toast may take several forms, including a small window generated in a portion of the web browser 521. An example of a toast is illustrated by element 380 of FIG. 3. Once the visual indicator is provided, the browser process 520 determines whether input has been received selecting the toast at step 1150. If input is received by the browser process 520 selecting the visual indicator, operation continues to step 1160.

At step 1160, the system determines if the visual indicator was for a new email or a new instant message. If the visual indicator was for a new email, email system 532 provides a read email message interface in browser 521 at step 1162. Thus, upon selecting the visual indicator, email system 532 opens the new mail and presents the contents to the user through web browser 521. If the visual indicator was for an instant message, the browser process provides a new instant message conversation window at step 1164. The new window will be configured for a conversation with the sender of the instant message.

If input selecting the visual indicator is not received by the browser process 520 within a period of time at step 1150, operation continues to step 1170 where the system determines whether the visual indicator is for IM or an email. If at step 1172 the visual indicator is for an instant message, a conversation window for the instant message is opened behind the current window at step 1172. Optionally, the system can then determine if the new window was blocked by a pop-up blocker at step 1174. If the new window was not blocked, operation continues to step 1184 where no action is taken. If the window was blocked by a pop-up blocker, operation continues to step 1176 where the system informs the user of the error and allows the user to request more information. In one embodiment, more information may include informing the user how to turn the pop-up blocker off.

If the visual indicator at step 1170 is for a new email, operation continues to step 1180. At step 1180, web browser process 520 determines if the web browser 521 is currently loaded with an inbox interface. If the web browser 521 is currently loaded with the inbox page at step 1180, the browser process 520 refreshes the inbox at step 1182. In one embodiment, this is done by sending an inbox interface page request to email system 532 at step 1182. If at step 1180 the inbox interface is not currently displayed, operation continues to step 1184 where email system 532 takes no further action.

Figure 12:
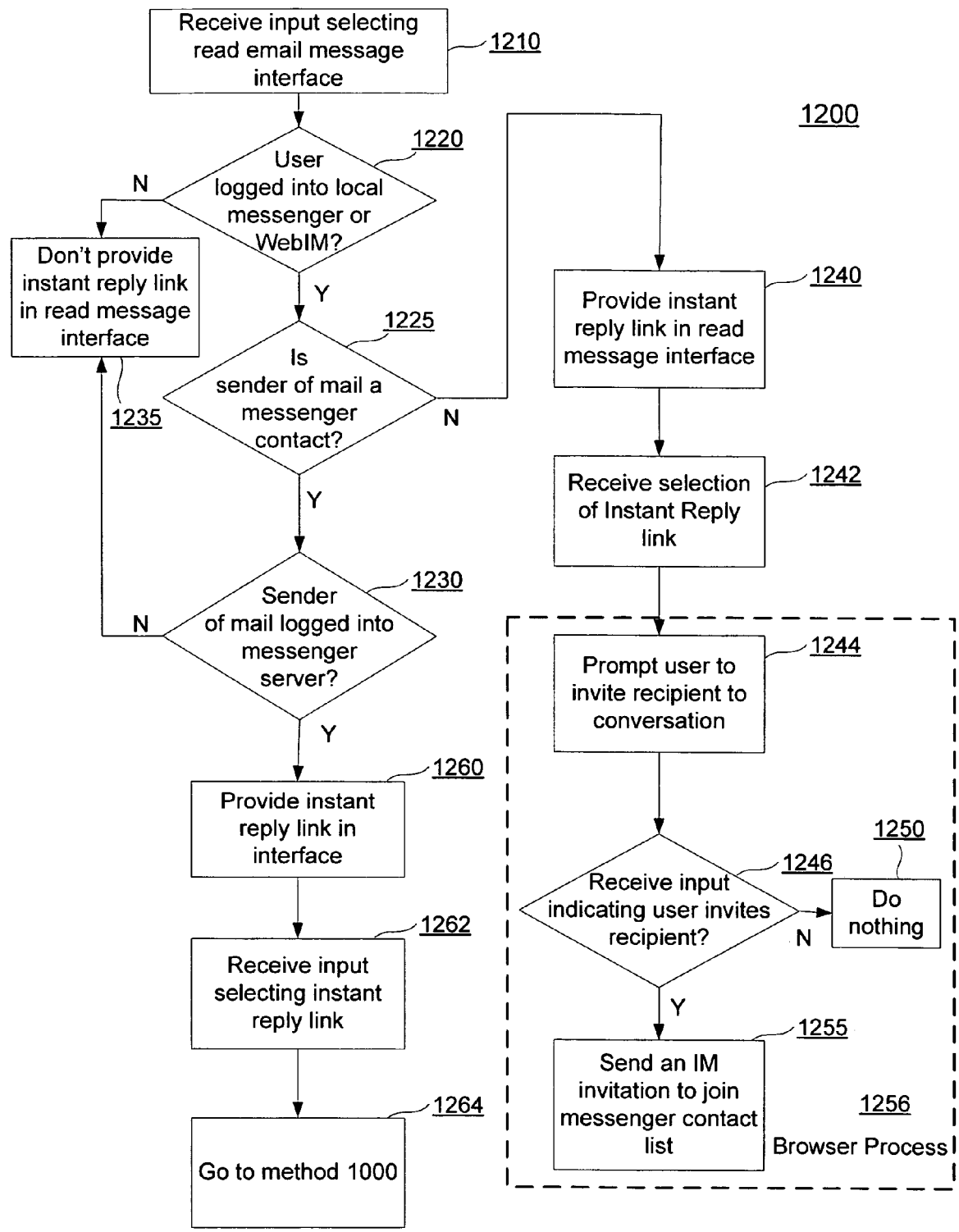
FIG. 12 illustrates one embodiment of a method for replying to an email with an instant message.

A user may reply to an email with another email or with an instant message. FIG. 12 illustrates a method 1200 for replying to an email with an instant message. Method 1200 begins when the web browser 521 receives input selecting to read an email at step 1210. The input is provided to email system 532 which then determines whether the user is logged into IM system 530 via local messenger client or WebIM at step 1220. Steps of method 800 disclose how to determine if the user is logged into the via local messenger client 519 or WebIM (or browser process) 520. If the user is not logged into the local messenger client or WebIM, operation continues to step 1235 wherein email system 532 does not provide an interface with an instant reply link.

If at step 1220 the user is logged into IM system 530, operation continues to step 1225 wherein the email system determines if the sender of the email to reply to is on the user's messenger contact list. In one embodiment, email system 532 queries ABS 511 for the user messenger's contact list. The query can include the user identifier for the recipient of the email. In embodiment, the ABS query is only performed if email system 532 does not have a locally cached copy of the messenger contact list. ABS 511 retrieves the messenger contact list and sends the list and the user identifier to email system 532. Email system 532 then determines if the sender of the email is listed on the messenger contact list.

At step 1225, if the sender of the email is a messenger contact of the user, the email system 532 determines if the sender is logged into IM system 530 at step 1230. In one embodiment, email system 532 initiates a session request to determine if the sender of the email is logged into IM system 530. If the user is logged in through local messenger client 519, the web browser 521 sends the session request. If the user is logged in through web IM server 517, the browser process 520 sends the session request. The results of the request are returned to email system 532.

If the sender is not logged in, operation continues to step 1235 and the instant reply link is not provided on the read email interface page provided by email system 532. If the sender is logged in to the IM system 530, operation continues to step 1260 where the read mail interface includes an instant reply link. An example of a read mail interface having an instant reply link is illustrated in FIG. 4A. When the web browser 520 receives input selecting the instant reply link at step 1262, operation of method 1100 will send an IM as discussed in more detail in method 1000 of FIG. 10.

If at step 1225 email system 532 determines that the sender is not on the user's messenger contact list, operation continues to step 1240 where email system 532 provides an instant reply button in the read email interface. In on embodiment, the instant reply button is represented differently than that of step 1260 and accesses a slightly different function. In another embodiment, before step 1240, the system determines whether the sender of the email is associated with an identifier that indicates the sender has an account within the domain of the email and IM service. In one embodiment, a sender may have access to a domain if he or she has an email that includes a domain indication. A domain may include contacts having an email that includes the same portion after the "@" character. For example, the senders listed in the inbox content 280 all have the same "@network" and are have access to the same domain. If the sender does not have access to the domain, operation continues to step 1225 wherein the instant reply option is not provided in the read email interface. If the user has access to the domain, operation continues to step 1244 wherein email system 532 provides the instant reply button in the read email interface at step 1244. As indicated by marker 1256, steps 1244, 1246, 1250 and 1255 are performed by browser process.

At step 1242, when the instant reply link is selected by the user at step 1242, the system prompts the user to invite the recipient to the conversation at step 1244. If web browser 521 receives input indicating the user invites the recipient to a conversation, the system sends an IM invitation as an email to the sender requesting that he or she join the user's messenger contact list at step 1255. In one embodiment, the email includes a URL to a conversation window. If the system does not receive input indicating the user invites the recipient to a conversation, no action is taken and operation ends at step 1250.

Figure 13:
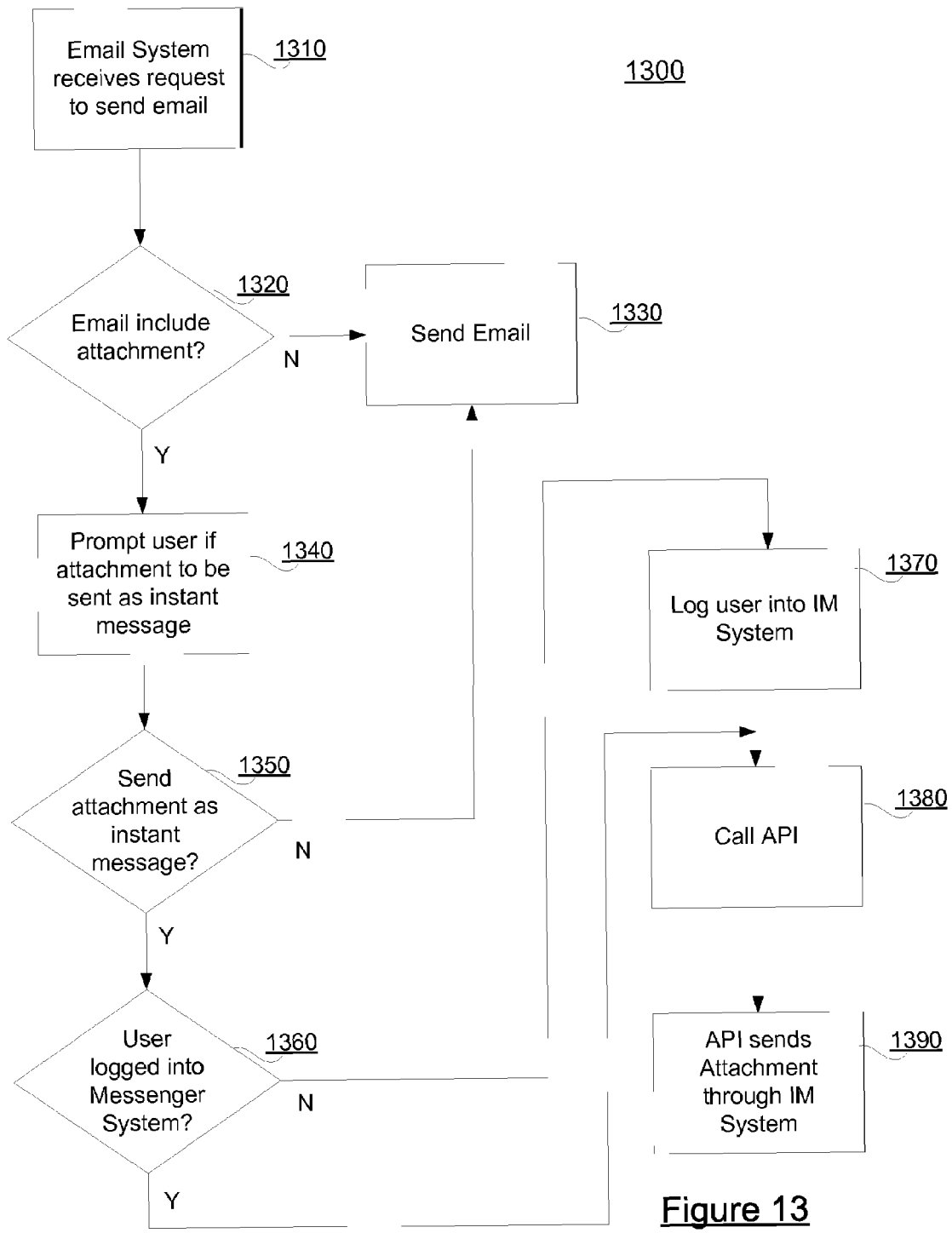
FIG. 13 illustrates one embodiment of a method for sending an email attachment as an instant message.

A user may wish to send emails having attachments. The present system will automatically detect the attachment and give a user the option to send the attachment to the recipient using IM system 530 rather than the email system. A user may choose to send an attachment to an email instantly through the IM service. FIG. 13 illustrates a method 1300 for sending an email attachment to the email recipient through IM system 530. The web browser 521 sends a send email message to email system 532. Email system 532 receives the request to send an email at step 1310. Email system 532 determines if the email request includes an attached file at step 1320. If the email does not have an attached file, the email is processed as normal for routing by email system 532 at step 1330.

If the email includes an attachment, operation continues to step 1340 wherein email system 532 provides an interface page to the user through web browser 521 inquiring whether the user would like to send the attachment via an instant message. Web browser 521 receives input from the user on the inquiry page and forwards the input to email system 532. Email system 532 then determines whether the file should be attached or sent by instant message at step 1350. If the user indicated the attachment should not be sent instantly, operation continues to step 1330. If the user indicated the attachment should be sent using an instant message, operation continues to step 1360 wherein the system determines if the user is logged into IM system 530. Step 1360 can be performed according to method 800.

If the user is signed into IM system 530, operation continues to step 1380. If the user is not currently logged into IM system 530, the system logs the user in to IM system 530 through web IM server 517 or local messenger client at step 1370. Operation then continues to step 1380 wherein an API on the local messenger client 519 or web IM server 517 is called with the email attachment. Local messenger client 519 or web IM server 517 then send the attachment to the recipient at step 1390.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for providing a service over a network, comprising:
   storing service access account information for each of a plurality of users;
   supplying an email service through a network to each user having a service access account;
   supplying an instant messaging service through the network to each user having a service access account;
   providing one or more content pages to be rendered by a network browser on a client by the email service for each of the plurality of users; and
   transmitting an application to the client for each user by an application server,
   the application configured to be embedded within the one or more content pages and communicate with the instant messaging service,
   the one or more rendered content pages and the embedded application configured to allow each of said plurality of users having a service access account to interact with the email and instant messaging services through a common interface provided at the client, wherein a construct is an inline frame, and wherein said step of transmitting an application includes:
   transmitting the construct to the network browser from the application server, the construct configured to be executed upon receipt by the network browser to,
   determine whether a client based IM application on the client has a connection with the instant messaging service, the client based IM application a stand-alone program that provides an instant-messaging user interface and correlates data received from the instant messaging service,
   establishing a connection with the instant messaging service by the construct through the client based IM application if the client based IM application has a connection, and
   establishing a direct connection with the instant messaging service by the construct if the client based IM application does not have a connection.

2. The method of claim 1, wherein said step of transmitting an application includes:
   determining that the client based IM application on the client does not have a connection with the instant messaging service; and
   retrieving the application from a server in response to said step of determining that the client based IM application on the client does not have a connection.

3. The method of claim 1, wherein
   the email service is provided through a first set of one or more servers,
   the instant messaging service is provided by a second set of one or more servers,
   said one or more content pages configured to enable the network browser to communicate with the first set of one or more servers,
   said application embedded within the one or more content pages configured to communicate with the second set of one or more servers.

4. The method of claim 1, wherein said step of transmitting an application includes:
   transmitting a construct to the network browser from the application server, the construct configured to be executed upon receipt by the network browser to,
   determine whether a client based IM application on the client has a connection with the instant messaging service, and
   establish a direct connection with the instant messaging service based on whether the client based IM application has developed a connection with the instant messaging service.

5. The method of claim 1, wherein: said step of providing an application includes
   providing an email interface having instant messaging status information and instant messaging service access links.

6. The method of claim 5, wherein:
   the instant messaging status information includes user instant messaging status.

7. The method of claim 6, wherein:
   the user instant messaging status is a user presence status.

8. The method of claim 5, wherein:
   step of supplying an instant messaging service includes:
   determining the user has not previously accessed the instant messaging service; and
   indicating in the instant messaging status information that the user has access to the instant messenger service without validating user access to the instant messaging service.

9. The method of claim 5, wherein:
   the instant messaging status information includes contact instant messaging status information.

10. The method of claim 5, wherein:
the instant messaging service access links include:
an instant response link to a sender of an email through the instant messaging service.

11. The method of claim 5, wherein:
the instant messaging service access links include:
an instant response link sending a sender of an email a URL to an instant messaging session.

12. The method of claim 5, wherein:
the instant messaging service access links include:
an add messenger contact link adding email contacts to a messenger contact list.

13. The method of claim 5, wherein:
the instant messaging service access links include:
a transmit file link transmitting an email file attachment to an email recipient using the instant messaging service.

14. The method of claim 5, wherein:
the instant messaging service access links include:
an instant messaging session acceptance link providing access to an instant messaging session.

15. The method of claim 5, wherein:
the instant messaging service access links include:
an alert link providing access to alert information associated with an alert.

16. The method of claim 15, wherein:
the alert information includes email information.

17. The method of claim 15, wherein:
said step of providing an application includes:
providing email inbox information in the common interface in response to receiving input selecting the alert link.

18. A system for providing a service, comprising:
a data store containing server access account information for a plurality of users;
an email system connected to a network and accessible to each user having a server access account;
an instant messaging system connected to the network and accessible to each user having a server access account; and
an application server transmitting one or more content pages to be rendered by a network browser and transmitting an application to a client,
the application configured to be embedded in the one or more content pages, the rendered content pages and embedded application configured to allow users at the client having a service access account to interact with the email system and the instant messaging system through a common interface,
the application further configured to be executed upon receipt by the network browser to determine whether a stand-alone client based IM application on the client has a connection with the instant messaging system, the client based IM application able to provide an instant-messaging user interface and correlate data received from the instant messaging service,
the application further configured to establish a connection with the instant messaging system by the construct through the client based IM application if the client based IM application has a connection,
the application further configured to establishing a direct connection with the instant messaging system by the construct if the client based IM application does not have a connection.

19. The system of claim 18, wherein:
said application server including:
a validation component allowing a user to access the email system or the instant messaging system using the service access account information.

20. The system of claim 19, wherein:
the validation component receives access information from a user through a login interface.

21. The system of claim 19, wherein:
said application server includes:
an interface component providing an interface having instant messaging status information and instant messaging system access.

22. The system of claim 21, wherein:
the instant messaging status information including:
user instant messaging status.

23. The system of claim 21, wherein:
said instant messaging system determines the user has not previously accessed the instant messaging system and not validating user access to the instant messaging system, said interface component indicating the user has access to the instant messaging system.

24. The system of claim 21, wherein:
the instant messaging status information including:
contact instant messaging status.

25. The system of claim 21, wherein:
the instant messaging system access includes:
access to a sender of an email through the instant messaging system.

26. The system of claim 21, wherein:
the instant messaging system access includes:
access to provide a URL to an instant messaging session to a sender of an email through the instant messaging system.

27. The system of claim 21, wherein:
the instant messaging system access includes:
access to add email contacts to a messenger contact list in the instant messaging system.

28. The system of claim 21, wherein:
the instant messaging system access includes:
access to transmit an email file attachment to an email recipient through the instant messaging system.

29. The system of claim 21, wherein:
the instant messaging system access includes:
access to an instant messaging session.

30. The system of claim 21, wherein:
the instant messaging system access includes:
access to alert information associated with an alert.

31. The system of claim 30, wherein:
the interface includes:
email inbox information provided in response to receiving input selecting the alert.

32. A computer-readable storage medium having stored therein computer-executable instructions for performing steps comprising:
receiving content from an application server to render in a network browser at a client;
receiving an application to embed in the network browser rendered content at the client from an application server;
rendering the content to display an application interface for an email system and an instant messaging system in response to receiving the application;
accessing the email system responsive to user input from the application interface; and
accessing the instant messaging system responsive to user input from the application interface, wherein said step of accessing the instant messaging system includes, determine whether a client based IM application on the client has a connection with the instant messaging service, the client based IM application a stand-alone program that provides an instant-messaging user interface and correlates data received from the instant messaging system, establishing a connection with the instant messaging system by the application through the client based IM application if the client based IM application has a connection, and establishing a direct connection with the instant messaging system by the application if the client based IM application does not have a connection.

33. The computer-readable medium of claim 32 wherein the computer-executable instructions include computer-executable instructions for:

embedding the application in the rendered content; and communicating with the email system through an interface provided by the rendered content and accessing the instant messaging system through the application embedded in the rendered content.

34. The computer-readable medium of claim 32 wherein the computer-executable instructions include computer-executable instructions for:

displaying an email interface having instant messaging status information and instant messaging system access links.

35. The computer-readable medium of claim 34 wherein the computer-executable instructions include computer-executable instructions for:

displaying the instant messaging status information indicating the user has access to the instant messenger service without providing user access account information to the instant messaging system.

36. The computer-readable medium of claim 32 wherein the computer-executable instructions include computer-executable instructions for:

sending to the instant messaging system an instant message session request with the sender of an email received from the email system.

37. The computer-readable medium of claim 32 wherein the computer-executable instructions include computer-executable instructions for:

sending to the email system an instant message session request with the sender of an email received from the email system.

38. The computer-readable medium of claim 32 wherein the computer-executable instructions include computer-executable instructions for:

sending a request to the email system indicating one or more email contacts to add to a messenger contact list.

39. The computer-readable medium of claim 32 wherein the computer-executable instructions include computer-executable instructions for:

sending an email file attachment to an email recipient through the instant messaging system.

40. The computer-readable medium of claim 32 wherein the computer-executable instructions include computer-executable instructions for:

receiving an alert from the instant messaging system.

\* \* \* \* \*